US010379408B2

(12) United States Patent
Lee et al.

(10) Patent No.: US 10,379,408 B2
(45) Date of Patent: Aug. 13, 2019

(54) CURVED DISPLAY DEVICE

(71) Applicant: Samsung Display Co., Ltd., Yongin, Gyeonggi-Do (KR)

(72) Inventors: Hyeokjin Lee, Seongnam-si (KR); Ohjeong Kwon, Hwaseong-si (KR); Donghan Song, Hwaseong-si (KR); Sung-Jae Yun, Hwaseong-si (KR); Sujin Kim, Seoul (KR); Jinwon Kim, Suwon-si (KR); Kichul Shin, Seongnam-si (KR); Dong-Chul Shin, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 2 days.

(21) Appl. No.: 14/885,531

(22) Filed: Oct. 16, 2015

(65) Prior Publication Data
US 2016/0124277 A1    May 5, 2016

(30) Foreign Application Priority Data

Nov. 5, 2014   (KR) .................. 10-2014-0152780
Apr. 9, 2015   (KR) .................. 10-2015-0050148

(51) Int. Cl.
*G02F 1/1345*   (2006.01)
*G02F 1/1343*   (2006.01)
(Continued)

(52) U.S. Cl.
CPC ...... *G02F 1/134336* (2013.01); *G02F 1/1393* (2013.01); *G02F 1/133707* (2013.01);
(Continued)

(58) Field of Classification Search
CPC ......... G02F 1/134336; G02F 1/133707; G02F 1/133711; G02F 1/1393
See application file for complete search history.

(56) References Cited

U.S. PATENT DOCUMENTS 6,040,885 A * 3/2000 Koike ............... G02F 1/133753
                                                    349/123
8,514,357 B2   8/2013 Kim
(Continued)

FOREIGN PATENT DOCUMENTS

EP        2749931 A       7/2014
KR   10-2008-0028572 A    4/2008
(Continued)

*Primary Examiner* — James A Dudek
(74) *Attorney, Agent, or Firm* — H.C. Park & Associates, PLC

(57) ABSTRACT

A curved display device includes a display substrate, an opposite substrate, and a liquid crystal layer interposed between the display substrate and the opposite substrate. The display substrate is curved along a first direction and includes a pixel electrode and a second alignment layer disposed on the pixel electrode. The opposite substrate is coupled to the display substrate to be curved along the first direction and includes a common electrode and a first alignment layer disposed on the common electrode. The first alignment layer comprises different material from the second alignment layer. The pixel electrode includes branch portions extending in a direction inclined with respect to the first direction when viewed in a plan view, and a pitch, which is defined by a sum of a width of each branch portion and a distance between the branch portions, is within a range from about 7.5 micrometers to about 8.5 micrometers.

12 Claims, 22 Drawing Sheets

(51) Int. Cl.
      *G02F 1/1337*      (2006.01)
      *G02F 1/139*       (2006.01)
(52) U.S. Cl.
      CPC .............. *G02F 1/133711* (2013.01); *G02F 2001/133773* (2013.01); *G02F 2001/134345* (2013.01)

(56) References Cited

U.S. PATENT DOCUMENTS

| | | |
|---|---|---|
| 8,619,222 B2 | 12/2013 | Nakamura et al. |
| 8,632,862 B2 | 1/2014 | Kim et al. |
| 8,830,428 B2 | 9/2014 | Miyakawa et al. |
| 8,945,692 B2 | 2/2015 | Suwa et al. |
| 2011/0051057 A1 | 3/2011 | Song et al. |
| 2013/0194536 A1 | 8/2013 | Tae et al. |
| 2013/0335687 A1* | 12/2013 | Shen ................ G02F 1/133753 349/126 |
| 2014/0152934 A1* | 6/2014 | Huh .................. G02F 1/133707 349/43 |
| 2014/0267994 A1* | 9/2014 | Ryu .................. G02F 1/133707 349/141 |
| 2015/0029455 A1 | 1/2015 | Kim et al. |
| 2015/0055063 A1* | 2/2015 | Hsieh ................ G02F 1/133753 349/99 |
| 2015/0083308 A1* | 3/2015 | Yang .................. C08G 73/1042 156/145 |
| 2016/0116774 A1* | 4/2016 | Ma ........................ G02F 1/1341 156/250 |

FOREIGN PATENT DOCUMENTS

| | | |
|---|---|---|
| KR | 10-2010-0084823 A | 7/2010 |
| KR | 10-2011-0029890 A | 3/2011 |
| KR | 10-2011-0061120 A | 6/2011 |
| KR | 10-1473792 B1 | 12/2014 |
| KR | 10-2015-0012093 A | 2/2015 |

* cited by examiner

Pitch = 4.0μm
Brightness decrease rate:10.6%

Pitch = 6.0μm
Brightness decrease rate:13.3%

Pitch = 8.0μm
Brightness decrease rate:5.3%

Pitch = 6.0μm
Brightness decrease rate:8.7%
Width/Distance = 2.0μm/4.0μm < 1

Pitch = 6.0μm
Brightness decrease rate:13.3%
Width/Distance = 3.0μm/3.0μm = 1

Pitch = 6.0μm
Brightness decrease rate:11.1%
Width/Distance = 4.0μm/2.0μm > 1

Thickness of liquid
crystal layer(Cell Gap)
=2.5μm
Brightness decrease rate:9.6%

Thickness of liquid
crystal layer(Cell Gap)
=3.0μm
Brightness decrease rate:11.2%

Thickness of liquid
crystal layer(Cell Gap)
=3.5μm
Brightness decrease rate:12.7%

Thickness of liquid
crystal layer(Cell Gap)
=4.0μm
Brightness decrease rate:13.3%

Bend elastic constant of liquid crystal
(Bend Elastic Constant)=16.1
Brightness decrease rate:16.2%

Bend elastic constant of liquid crystal
(Bend Elastic Constant)=13.1
Brightness decrease rate:13.3%

Bend elastic constant of liquid crystal
(Bend Elastic Constant)=10.1
Brightness decrease rate:9.8%

Dielectric anisotropy(Δε)
= -3.5
Brightness decrease rate:10.4%

Dielectric anisotropy(Δε)
= -3.2
Brightness decrease rate:10.8%

Dielectric anisotropy(Δε)
= -2.8
Brightness decrease rate:13.3%

Dielectric anisotropy(Δε)
= -2.5
Brightness decrease rate:13.4%

Dielectric anisotropy(Δε)
= -2.2
Brightness decrease rate:24.0%

Dielectric anisotropy(Δε)
= -1.9
Brightness decrease rate:25.7%

CURVED DISPLAY DEVICE

CLAIM OF PRIORITY

This application makes reference to, incorporates the same herein, and claims all benefits accruing under 35 U.S.C. § 119 from two applications earlier filed in the Korean Intellectual Property Office of Nov. 5, 2014 and there duly assigned Serial No. 10-2014-0152780, and of Apr. 9, 2015 and there duly assigned Serial No. 10-2015-0050148.

BACKGROUND OF THE INVENTION

Field of the Invention

The present disclosure relates to a curved display device. More particularly, the present disclosure relates to a curved display device having a curved display area.

Description of the Related Art

A display device, e.g., a liquid crystal display, is widely applied to various information-processing devices, such as a television set, a monitor, a notebook computer, etc., to display an image. In recent years, a curved display device having a curved display area has been developed. The curved display device provides the image having improved three-dimensional effect, sense of immersion (or immersiveness), and presence to a viewer.

SUMMARY OF THE INVENTION

The present disclosure provides a curved display device having improved display quality.

Embodiments of the inventive concept provide a curved display device including a display substrate, an opposite substrate, and a liquid crystal layer interposed between the display substrate and the opposite substrate. The display substrate is curved along a first direction and includes a pixel electrode disposed in a pixel area and a second alignment layer disposed on the pixel electrode. The opposite substrate is coupled to the display substrate, curved along the first direction, and includes a common electrode generating an electric field in cooperation with the pixel electrode and a first alignment layer disposed on the common electrode. The first alignment layer comprises different material from the second alignment layer, and the first and second alignment layers align a portion of the liquid crystal molecules at pre-tilt angles. The pixel electrode includes branch portions extending in a direction inclined with respect to the first direction when viewed in a plan view, and a pitch, which is defined by a sum of a width of each branch portion and a distance between the branch portions, is within a range from about 7.5 micrometers to about 8.5 micrometers.

In the exemplary embodiment, first liquid crystal molecules, which are adjacent to the first alignment layer, of the liquid crystal molecules have a first pre-tilt (pretilt) angle. Second liquid crystal molecules, which are adjacent to the second alignment layer, of the liquid crystal molecules have a second pre-tilt angle different from the first pre-tilt angle.

Embodiments of the inventive concept provide a curved display device including a display substrate, an opposite substrate, and a liquid crystal layer interposed between the display substrate and the opposite substrate. The display substrate is curved along a first direction and includes a pixel electrode disposed in a pixel area and a second alignment layer disposed on the pixel electrode. The opposite substrate is coupled to the display substrate, curved along the first direction, and includes a common electrode generating an electric field in cooperation with the pixel electrode and a first alignment layer disposed on the common electrode. The liquid crystal layer has a thickness within a range from about 2.2 micrometers to about 2.8 micrometers. The first alignment layer comprises different material from the second alignment layer, and the first and second alignment layers align a portion of the liquid crystal molecules at pre-tilt angles.

Embodiments of the inventive concept provide a curved display device including a display substrate, an opposite substrate, and a liquid crystal layer interposed between the display substrate and the opposite substrate. The display substrate is curved along a first direction and includes a pixel electrode disposed in a pixel area and a second alignment layer disposed on the pixel electrode. The opposite substrate is coupled to the display substrate, curved along the first direction, and includes a common electrode generating an electric field in cooperation with the pixel electrode and a first alignment layer disposed on the common electrode. The liquid crystal molecules have a bend elastic constant ($K_{33}$) within a range from about 10.0 pN (piconewton) to about 13.0 pN (piconewton). The first alignment layer comprises different material from the second alignment layer, and the first and second alignment layers align a portion of the liquid crystal molecules at pre-tilt angles.

Embodiments of the inventive concept provide a curved display device including a display substrate, an opposite substrate, and a liquid crystal layer interposed between the display substrate and the opposite substrate. The display substrate is curved along a first direction and includes a pixel electrode disposed in a pixel area and a second alignment layer disposed on the pixel electrode. The opposite substrate is coupled to the display substrate, curved along the first direction, and includes a common electrode generating an electric field in cooperation with the pixel electrode and a first alignment layer disposed on the common electrode. The liquid crystal molecules have a negative dielectric anisotropy from about −3.2 to about −3.5. The first alignment layer comprises different material from the second alignment layer, and the first and second alignment layers align a portion of the liquid crystal molecules at pre-tilt angles.

According to the above, the brightness decrease rate, which is caused when the display panel is curved, may be minimized by controlling at least one of the pitch of the branch portions of the pixel electrode, the thickness of the liquid crystal layer, the bend elastic constant of the liquid crystal molecules, and the dielectric anisotropy of the liquid crystal molecules. Therefore, the brightness of the pixels may be prevented from being drastically deteriorated when the display panel is curved in the display panel including the domains arranged in the matrix form, and thus the display quality of the curved display device may be improved.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
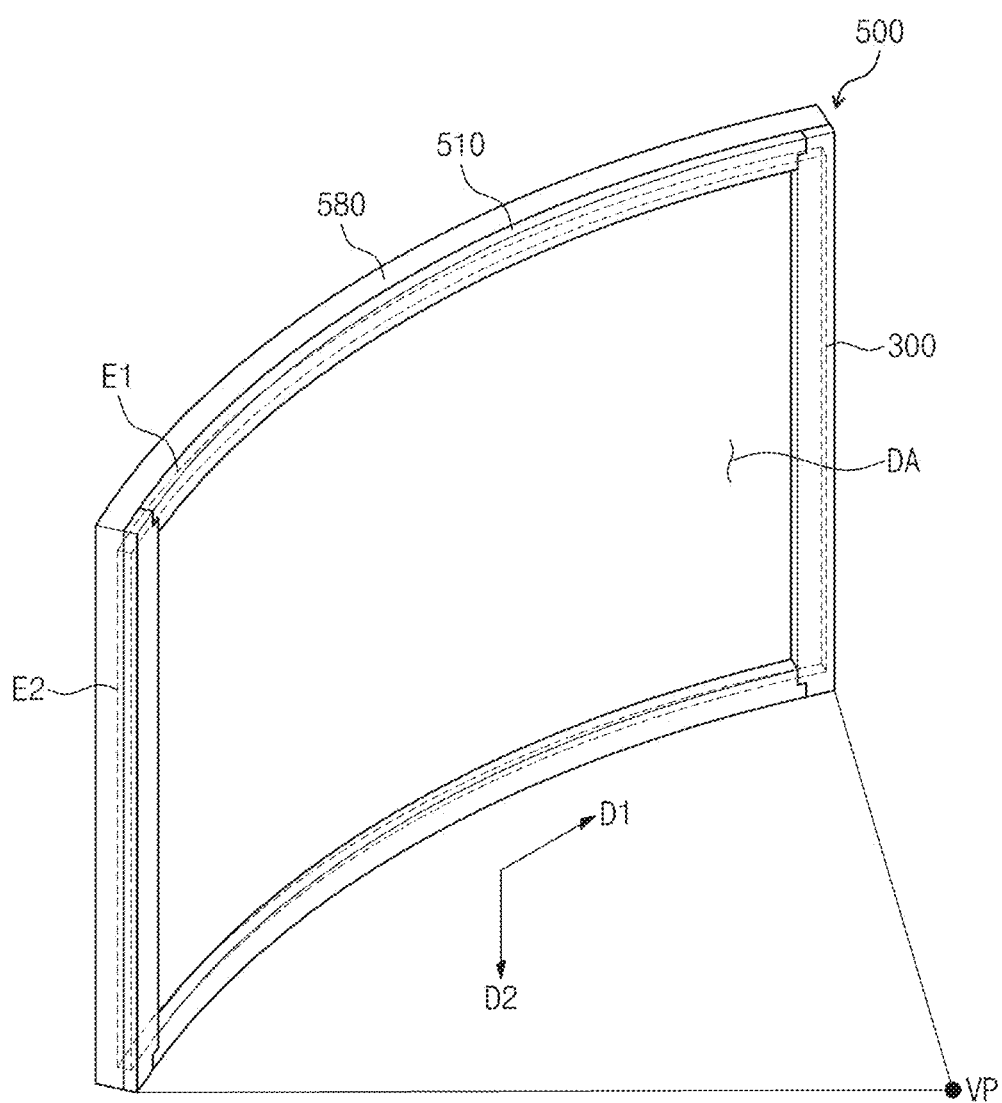
FIG. 1 is a perspective view showing a curved display device according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is a perspective view showing a curved display device 500 according to an exemplary embodiment of the present disclosure.

Referring to FIG. 1, the curved display device 500 is provided with a display area DA having a curved shape. In the present exemplary embodiment, a viewpoint VP of a viewer is defined at a front of the curved display device 500, and the display area DA has a concave-curved shape when viewed in front of the curved display device 500.

The curved display device 500 includes a display panel 300, and the display panel 300 is bent along a first direction D1 to have a curved shape in the first direction D1. The display panel 300 has long sides E1 and short sides E2. In the present exemplary embodiment, the long sides E1 extend in a curved line shape along the first direction D1, and the short sides E2 extend in a straight line shape along a second direction D2 substantially perpendicular to the first direction D1.

The curved display device 500 may further include other members coupled to the display panel 300. The members are coupled to the display panel 300 to allow the display panel 300 to be curved and to maintain the curved shape of the display panel 300. The members include an accommodating member 580 accommodating the display panel 300 and a covering member 510 coupled to the accommodating member 580 to cover the display panel 300.

When the display panel 300 is not coupled to the covering member 510 and the accommodating member 580, the display panel 300 may have a flat shape. When the display panel 300 is coupled to the covering member 510 and the accommodating member 580, the display panel 300 may have the curved shape. Thus, each of the accommodating member 580 and the covering member 510 may have the curved shape to correspond to the curved shape of the display panel 300. For instance, a bottom portion of the accommodating member 580, which faces a rear surface of the display panel 300, is curved in the first direction D1, and a portion of the covering member 510, which covers the long sides E1 of the display panel 300, is curved in the first direction D1.

In the present exemplary embodiment, the display panel 300 may be, but not limited to, a liquid crystal display panel. In this case, the curved display device 500 may further include a backlight assembly (not shown) accommodated in the accommodating member 580 and providing a light to the display panel 300.

As described above, the curved display device 500 includes the display panel 300, the backlight assembly, the accommodating member 580, and the covering member 510. However, the present exemplary embodiment should not be limited to the structures of the members included in the curved display device 500, except for the display panel 300. For instance, the backlight assembly may be an edge-illumination type backlight assembly including a light guide plate or may be a direct-illumination type backlight assembly having no light guide plate.

Figure 2A:
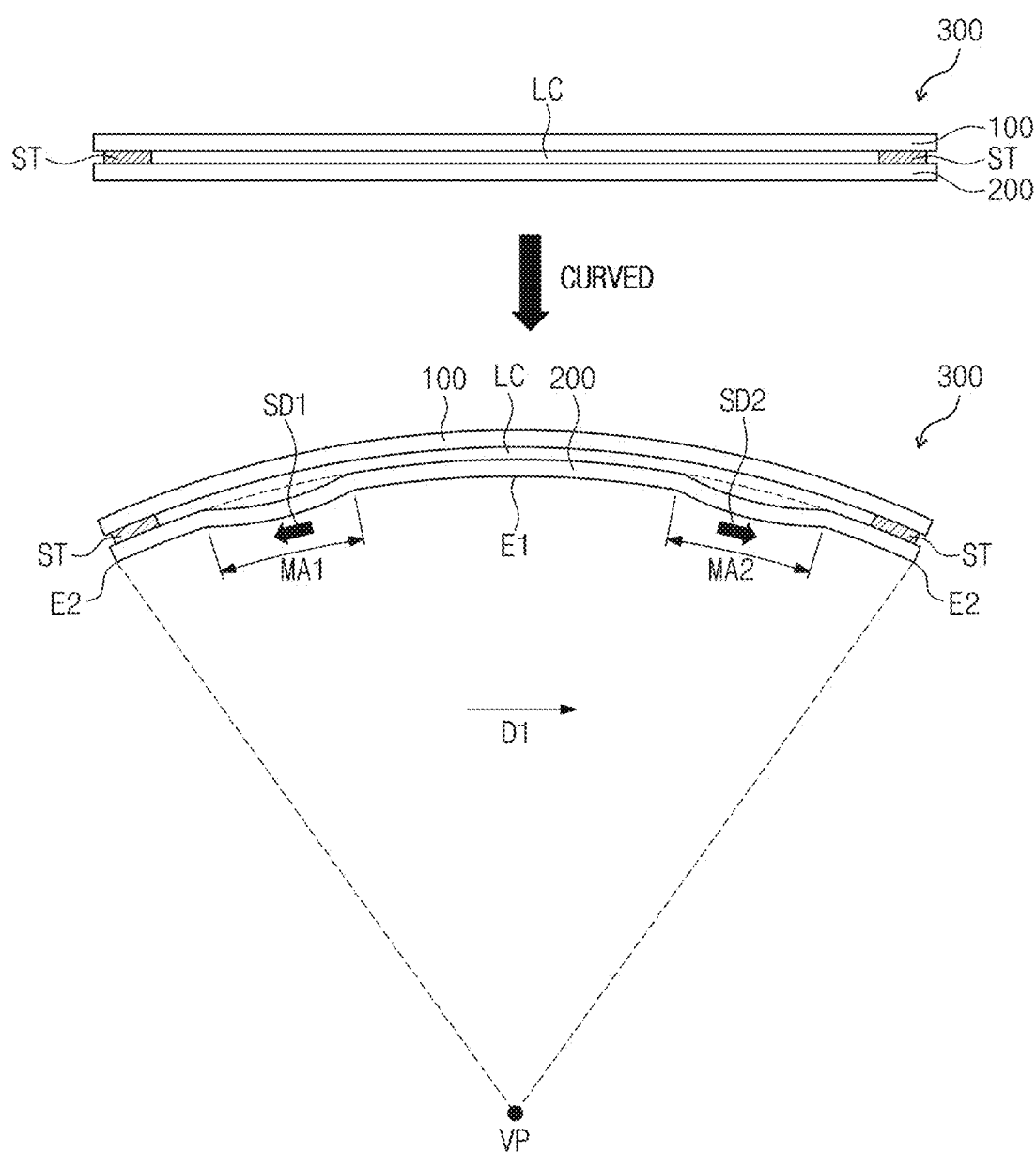
FIG. 2A is a cross-sectional view showing a display panel shown in FIG. 1.
Figure 2B:
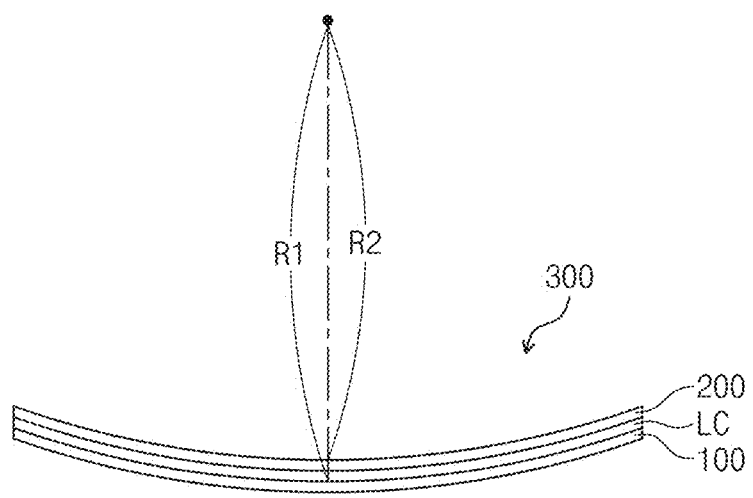
FIG. 2B is a schematic cross-sectional view of the curved display device according to an embodiment of the inventive concept.

FIG. 2A is a cross-sectional view showing the display panel 300 of FIG. 1. FIG. 2A shows the display panel 300 in a flat state and in a curved state. FIG. 2B is a schematic cross-sectional view of the curved display device according to an embodiment of the inventive concept. Meanwhile, even though a covering member 510 (see FIG. 1) and an accommodating member 580 (see FIG. 1) are now shown in FIG. 2, the covering and accommodating members are coupled to the display panel 300 to allow the display panel 300 to have the curved shape.

Referring to FIG. 2A and FIG. 2B, the display panel 300 includes a display substrate 100, an opposite substrate 200, a liquid crystal layer LC, and a sealant ST. The display substrate 100 faces the opposite substrate 200, and the liquid crystal layer LC is interposed between the display substrate 100 and the opposite substrate 200. The display substrate 100 has a first curvature radius R1, and the opposite substrate has a second curvature R2 radius (as shown in FIG. 2B). The sealant ST is provided along an edge of the display substrate 100 or an edge of the opposite substrate 200, and the display substrate 100 is coupled to the opposite substrate 200 by the sealant ST to allow the liquid crystal layer LC to be interposed between the display substrate 100 and the opposite substrate 200.

When the display panel 300 in the flat state is curved to have a concave shape with respect to the viewpoint VP, an expansive force is generated in the display substrate 100 and a contractive force is generated in the opposite substrate 200 since a radius of curvature of the opposite substrate 200 is smaller than a radius curvature of the display substrate 100. As a result, the opposite substrate 200 is partially lifted off, and thus a mis-alignment is caused between the display substrate 100 and the opposite substrate 200.

Assuming that a direction to which the opposite substrate 200 is shifted with respect to the display substrate 100 is referred to as a shift direction when the mis-alignment occurs, a position of the mis-alignment and the shift direction are defined as follows.

A first area MA1 and a second area MA2 are defined in the display panel 300, the first area MA1 corresponds to a left portion of the display area DA (refer to FIG. 1) with respect to the viewpoint VP, and the second area MA2 corresponds to a right portion of the display area DA with respect to the viewpoint VP. In the present exemplary embodiment, the mis-alignment may occur in each of the first and second areas MA1 and MA2. When the shift direction in the first area MA1 is referred to as a first shift direction SD1, the first shift direction D1 may be roughly headed toward a left edge of the display panel 300 in the first area MA1. When the shift direction in the second area MA2 is referred to as a second shift direction SD2, the second shift direction D2 may be roughly headed toward a right edge of the display panel 300 in the second area MA2.

In general, when the mis-alignment occurs, a direction in which first pre-tilt liquid crystal molecules PL1 (refer to FIG. 4C) are pre-tilted by a first alignment layer AL1 (refer to FIG. 4C) is different from a direction in which second pre-tilt liquid crystal molecules PL2 (refer to FIG. 4C) are pre-tilted by a second alignment layer AL2 (refer to FIG. 4C) in one domain of several pixels. Accordingly, an amount of the mis-aligned liquid crystal molecules in the liquid crystal layer LC (refer to FIG. 4C) increases, and as a result a brightness of the pixels is deteriorated. However, according to the present exemplary embodiment, the amount of the mis-aligned liquid crystal molecules in the liquid crystal layer is reduced even though the mis-alignment occurs, and thus the deterioration of the brightness in the pixel is minimized.

Figure 3:
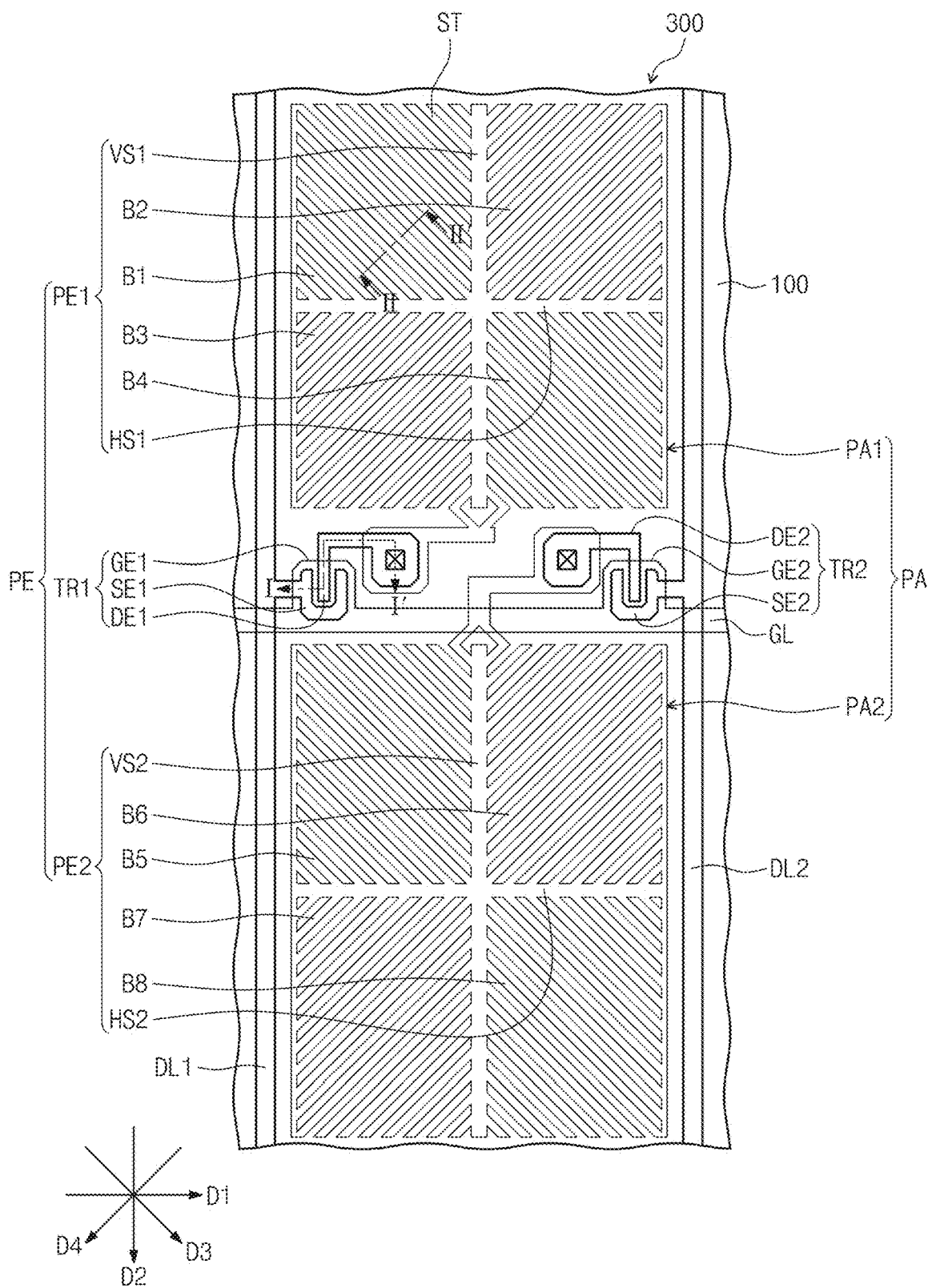
FIG. 3 is a plan view showing a pixel in the display panel of the curved display device shown in FIG. 2A.
Figure 4A:
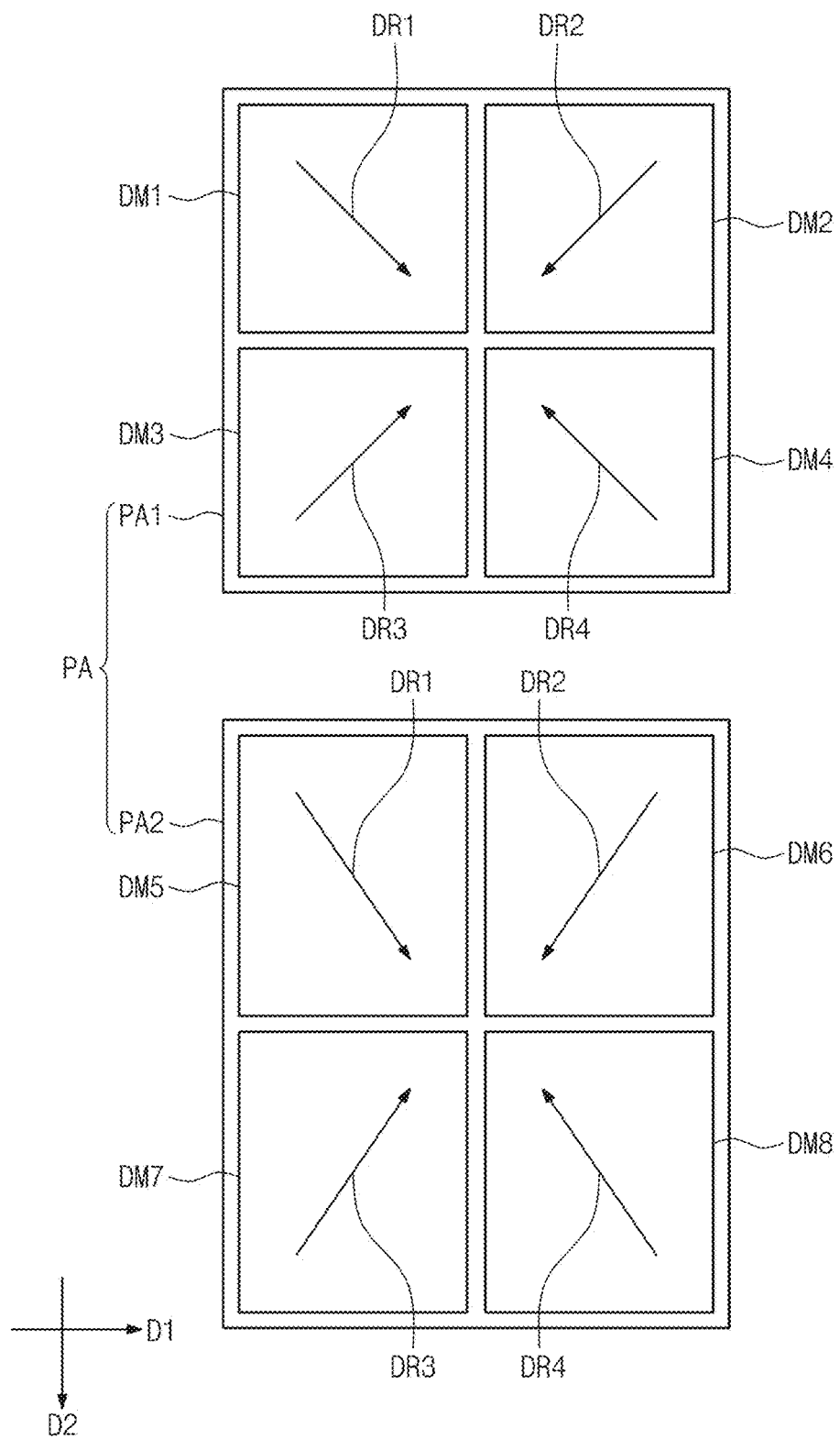
FIG. 4A is a view showing domains defined in the pixel shown in FIG. 3.
Figure 4B:
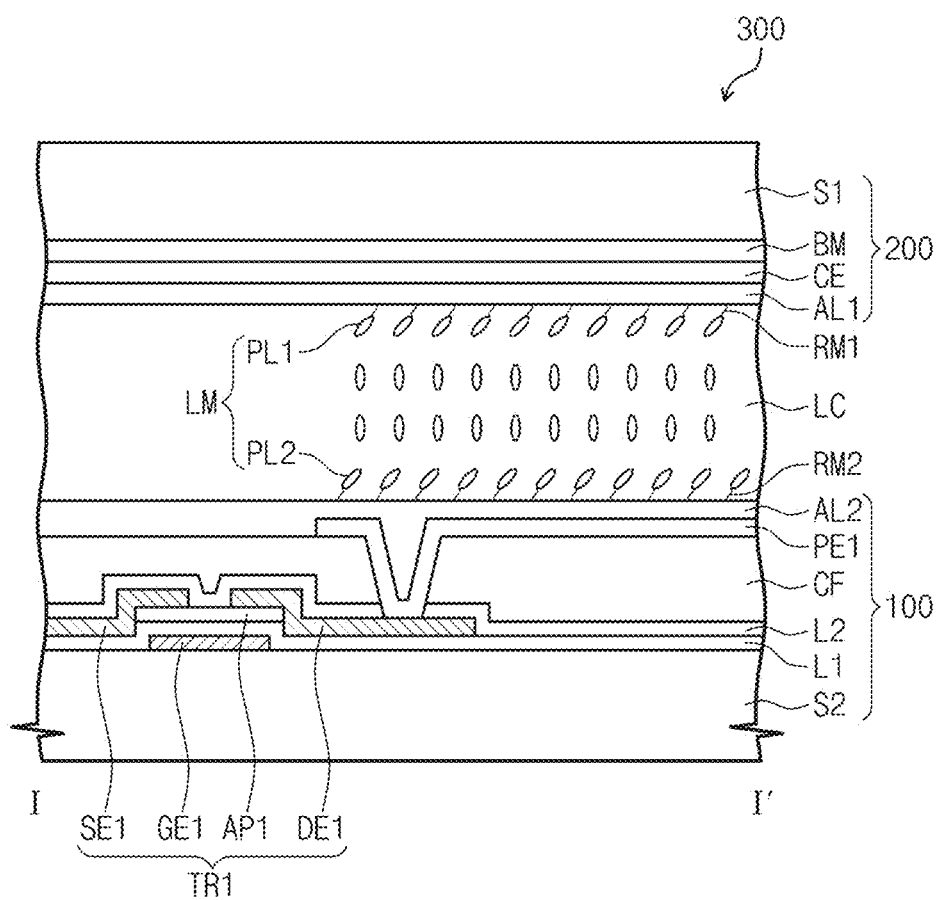
FIG. 4B is a cross-sectional view taken along a line I-I' of FIG. 3.
Figure 4C:
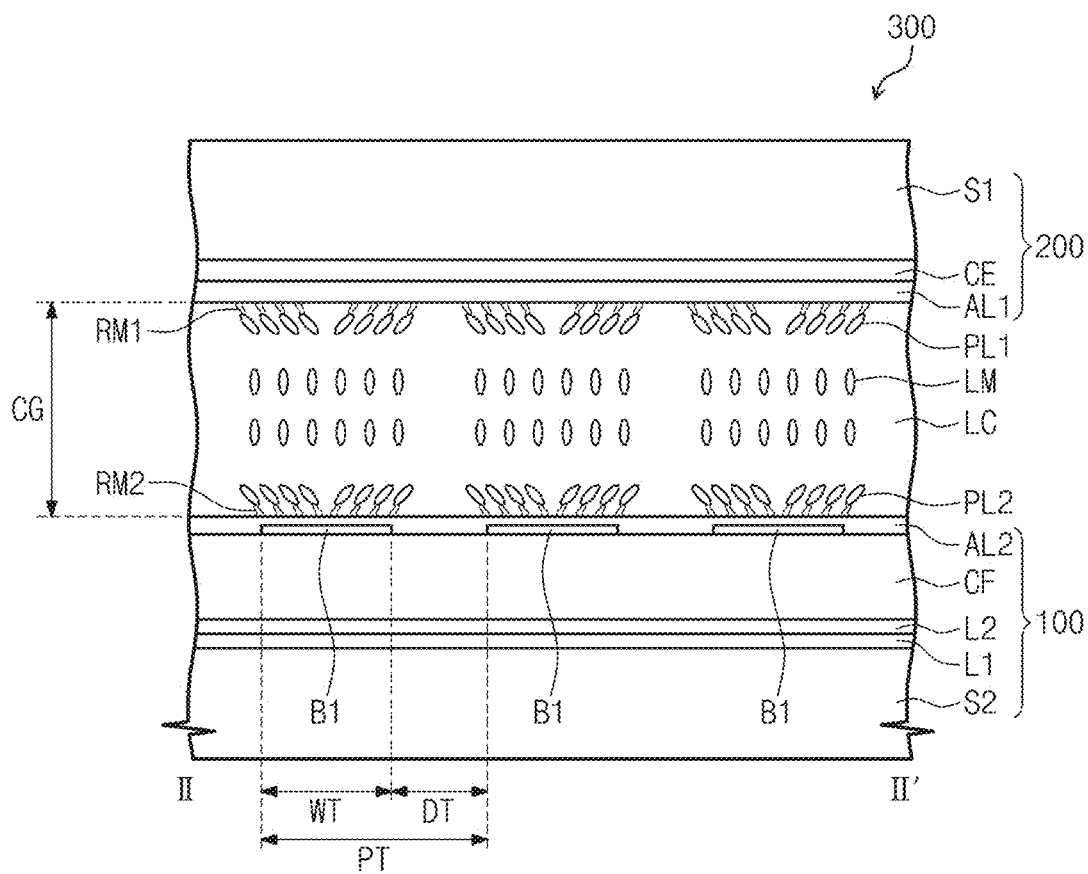
FIG. 4C is a cross-sectional view taken along a line II-II' of FIG. 3.
Figure 4D:
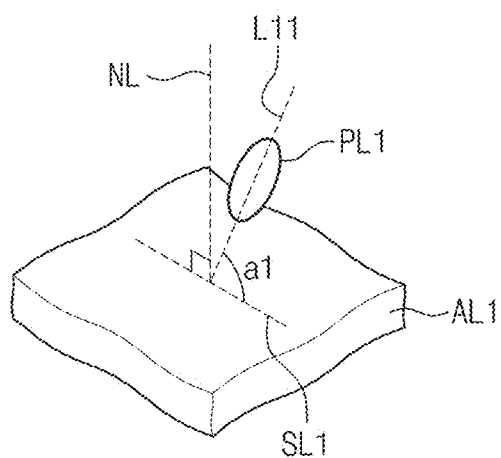
FIG. 4D is an enlarged view of a first pre-tilt liquid crystal illustrated in FIG. 4B.
Figure 4E:
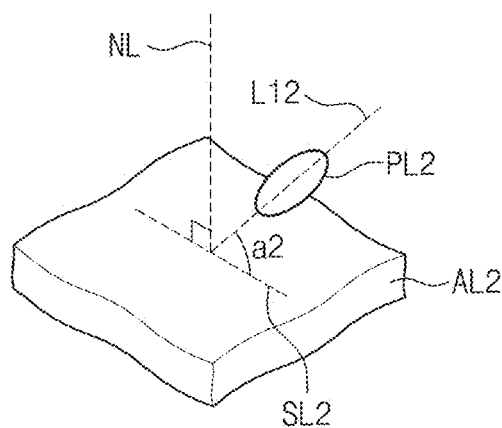
FIG. 4E is a view of a second pre-tilt liquid crystal illustrated in FIG. 4B.

FIG. 3 is a plan view showing the pixel in the display panel 300 of the curved display device shown in FIG. 2A. FIG. 4A is a view showing domains defined in the pixel shown in FIG. 3. FIG. 4B is a cross-sectional view taken along a line I-I' of FIG. 3. FIG. 4C is a cross-sectional view taken along a line II-II' of FIG. 3. FIG. 4D is an enlarged view of a first pre-tilt liquid crystal illustrated in FIG. 4B, and FIG. 4E is a view of a second pre-tilt liquid crystal illustrated in FIG. 4B.

Referring to FIGS. 3, 4A, 4B, 4C, 4D and 4E, and in particular FIG. 4B, the opposite substrate 200 includes a first base substrate S1, a light blocking layer BM, a common electrode CE, and the first alignment layer AL1. The first base substrate S1 may be, but not limited to, a glass substrate having a light transmittance property.

The common electrode CE is disposed on the first base substrate S1, and the common electrode CE generates an electric field in cooperation with a pixel electrode PE to control an alignment direction of the liquid crystal molecules LM in the liquid crystal layer LC. The light blocking layer BM includes a material having a light blocking property. The light blocking layer BM is disposed on the first base substrate S1 and overlapped with an area between a first sub-pixel area PA1 (refer to FIGS. 3 and 4A) and a second sub-pixel area PA2 (refer to FIGS. 3 and 4A).

Although the light blocking layer BM is disposed on the first base substrate S1 in this embodiment, the present disclosure is not limited thereto. For example, in another embodiment, the light blocking layer BM may be disposed on a second base substrate S2.

The first alignment layer AL1 aligns a portion of the liquid crystal molecules LM at a pre-tilt angle. The first alignment layer AL1 aligns the first pre-tilt liquid crystal molecules PL1 at a first pre-tilt angle a1. In more detail, as illustrated FIG. 4D, when a normal line NL of the first alignment layer AL1, a first straight line SL1 on the first alignment layer AL1, and a first long axis L11 of the first pre-tilt liquid crystal molecules PL1, the first pre-tilt angle a1 may be defined as an angle between the first long axis L11 and the first straight line SL1. Referring to FIGS. 3 and 4A to 4E again, for example, the first pre-tilt angle a1 may be a value of each of the pre-tilt angles of the liquid crystal molecule adjacent to the first alignment layer AL1, a mean value of the pre-tilt angles of the liquid crystal molecule adjacent to the first alignment layer AL1, or a representative value of the pre-tilt angle of the liquid crystal molecules adjacent to the first alignment layer AL1.

The first pre-tilt angle a1 is different from a second pre-tilt angle a2 (see FIG. 4E), and the first pre-tilt angle a1 is greater than the second pre-tilt angle a2. In the exemplary embodiment, the first pre-tilt-angle a1 may range of about 88° to about 90°, in more detail, the first pre-tilt angle a1 may be greater than 89° and be less than 90°. Additionally, when the second pre-tilt angle a2 is set to an angle of about 80°, 85°, 86°, or 89° according to an embodiment of the inventive concept, the first pre-tilt angle a1 may be set to an angle of about 89.5° or about 90° that is greater than that of the second pre-tilt angle a2.

The liquid crystal molecules LM include the first pre-tilt liquid crystal molecules PL1 disposed adjacent to the first alignment layer AL1, and the first alignment layer AL1 reacts to reactive mesogen RM1 to fix the first pre-tilt liquid crystal molecules PL1 to the first alignment layer AL1.

The first alignment layer AL1 is not specifically limited to a material thereof if the material is commonly used. The first alignment layer AL1 may be formed of a monomer dimer, or oligomer of polymers such as polyimide, poly(amic acid), polyamide, poly(amic imide), polyester, polyethylene, polyurethane, or polystyrene, or mixture of the thereof. In this exemplary embodiment, the first alignment layer AL1 may not include a photoinitiator.

Referring to FIGS. 3 and 4B, the display substrate 100, includes a second base substrate S2, a gate line GL, a first data line DL1, a second data line DL2, a first thin film transistor TR1, a second thin film transistor TR2, the pixel electrode PE, a color filter CF, and a second alignment layer AL2.

The second base substrate S2 may be, but not limited to, a glass substrate having a light transmittance property. The gate line GL is disposed on the second base substrate S2 and electrically connected to the first and second thin film transistors TR1 and TR2 to apply a gate signal to the first and second thin film transistors TR1 and TR2.

In the present exemplary embodiment, the pixel area PA is divided into the first sub-pixel area PA1 and the second sub-pixel area PA2, and the pixel electrode PE includes a first sub-pixel electrode PE1 disposed in the first sub-pixel area PA1 and a second sub-pixel electrode PE2 disposed in the second sub-pixel area PA2.

The first and second data lines DL1 and DL2 are insulated from the gate line GL and disposed on the second base substrate S2. The first data line DL1 transfers a first data signal and the second data line DL2 transfers a second data signal. The first thin film transistor TR1 is electrically connected to the gate line GL, the first data line DL1, and the first sub-pixel electrode PE1. The first thin film transistor TR1 includes a first gate electrode GE1, a first active pattern AP1 (FIG. 4B), a first source electrode SE1, and a first drain electrode DEL A gate insulating layer L1 covers the gate electrode GE1 and second base substrate S2. A second insulating layer L2 covers the gate insulating layer L1 and first and second thin film transistors TR1 and TR2. The color filter CF is disposed on the second insulating layer L2 to filter a light incident to the display substrate 100 through the second base substrate S2 to a colored light.

The second alignment layer AL2 aligns a portion of the liquid crystal molecules LM at a pre-tilt angle. In this exemplary embodiment, the second alignment layer AL2 aligns the second liquid crystal molecules (i.e., second pre-tilt liquid crystals PL2) at a second pre-tilt angle a2. In more detail, as shown FIG. 4E, when a normal line NL of the second alignment layer AL2, a second long axis L12 on the second alignment layer AL2, and a second straight line SL2 of the second pre-tilt liquid crystals PL2, the second pre-tilt angle a2 may be defined as an angle between the second long axis L12 and the second straight line SL2.

The first alignment layer AL1 aligns a portion of the liquid crystal molecules LM at a pre-tilt angle. The first alignment layer AL1 aligns the first pre-tilt liquid crystals PL1 at a first pre-tilt angle a1. In more detail, as illustrated FIG. 4D, when a normal line NL of the first alignment layer AL1, a first long axis L11 on the first alignment layer AL1, and a first long axis L11 of the first pre-tilt liquid crystals PL1, the first pre-tilt angle a1 may be defined as an angle between the first long axis L11 and the first straight line SL1.

Referring to FIGS. 3 and 4A to 4E again, for example, the second pre-tilt angle a2 may be a value of each of the pre-tilt angles of the liquid crystal molecule adjacent to the second alignment layer AL2, a mean value of the pre-tilt angles of the liquid crystal molecule adjacent to the second alignment layer AL2, or a representative value of the pre-tilt angle of the liquid crystal molecules adjacent to the second alignment layer AL2.

The second pre-tilt angle a2 is different from the first pre-tilt angle a1. In this exemplary embodiment, the second pre-tilt angle a2 is in a range from 80° to 90°, in more detail, the second pre-tilt angle a2 is in a range from 80° to 89°.

The liquid crystal molecules LM comprise a second pre-tilt liquid crystals PL2, and the second alignment layer AL2 react reactive mesogens RM2 to fix the second pre-tilt liquid crystals PL2 to the second alignment layer AL2.

The second alignment layer AL2 is not specifically limited to a material thereof if the material is commonly used. For example, the second alignment layer AL2 may include a monomer dimer, or oligomer of polymers such as polyimide, poly(amic acid), polyamide, poly(amic imide), polyester, polyethylene, polyurethane, or polystyrene or a mixture thereof. The second alignment layer AL2 further includes a photoinitiator. The photoinitiator may initiate a polymerization of the reactive mesogens RM2.

The photoinitiator is not specifically limited to a material thereof if the material is commonly used. For example, the photoinitiator may include at least one of benzyl dimethyl ketal, a-hydroxyketone, methylbenzoylformate, acrylophosphine oxide, titALocene, a-amonoketone, a-aminoacetophenone and oxime ester.

The second thin film transistor TR2 is electrically connected to the gate line GL, the second data line DL2, and the second sub-pixel electrode PE2. The second thin film transistor TR2 includes a second gate electrode GE2, a second active pattern (not shown), a second source electrode SE2, and a second drain electrode DE2.

The first and second thin film transistors TR1 and TR2 are turned on in response to a gate signal, a first data signal is applied to the first sub-pixel electrode PE1 through the first thin film transistor TR1, and a second data signal different from the first data signal is applied to the second sub-pixel electrode PE2 through the second thin film transistor TR2. The first and second sub-pixel electrodes PE1 and PE2 are driven by different data signals from each other, and thus different grayscale levels are displayed in the first and second sub-pixel areas PA1 and PA2, respectively.

Referring again to FIG. 3, the first sub-pixel electrode PE1 includes a first horizontal trunk portion HS1, a first vertical trunk portion VS1, and first, second, third, and fourth branch portions B1, B2, B3, and B4.

The first horizontal trunk portion HS1 extends in the first direction D1 to cross the first sub-pixel area PA1, and the first vertical trunk portion VS1 extends in the second direction D2 to cross the first sub-pixel area PA1. The first vertical trunk portion VS1 crosses the first horizontal trunk portion HS1 and is connected to the first horizontal trunk portion HS1. In the present exemplary embodiment, the first direction D1 crosses the second direction D2. More particularly, the first direction D1 is substantially perpendicular to the second direction D2.

The first branch portions B1 are branched from the first horizontal trunk portion HS1 or the first vertical trunk portion VS1. The first branch portions B1 are spaced apart from each other to allow a slit ST to be defined between two first branch portions B1 adjacent to each other. Each of the first branch portions B1 extends in a third direction D3 inclined with respect to the first direction D1 and the second direction D2 when viewed in a plan view.

The second branch portions B2 are branched from the first horizontal trunk portion HS1 or the first vertical trunk portion VS1. Each of the second branch portions B2 extends in a fourth direction D4 inclined with respect to the first direction D1 and the second direction D2 when viewed in a plan view, and the fourth direction D4 crosses the third direction D3 when viewed in a plan view, however, the first and second branch portions B1 and B2 do not cross each other.

The third branch portions B3 are branched from the first horizontal trunk portion HS1 or the first vertical trunk portion VS1, and the fourth branch portions B4 are branched from the first horizontal trunk portion HS1 or the first vertical trunk portion VS1. Each of the third branch portions B3 extends in the fourth direction D4 and each of the fourth branch portions B4 extends in the third direction D3 when viewed in a plan view, such that the third and fourth branch portions B3 and B4 do not cross each other.

The second sub-pixel electrode PE2 includes a second horizontal trunk portion HS2, a second vertical trunk portion VS2, and fifth, sixth, seventh, and eighth branch portions B5, B6, B7, and B8. In the present exemplary embodiment, the second sub-pixel electrode PE2 may have a size greater than that of the first sub-pixel electrode PE1. However, since the structure of the second sub-pixel electrode PE2 is substantially similar to that of the first sub-pixel electrode PE1, detailed descriptions on the second sub-pixel electrode PE2 will be omitted.

Referring to FIG. 4A, when the first to eighth branch portions B1 to B8 have the above-described structure, first, second, third, and fourth domains DM1, DM2, DM3, and DM4 are defined in the first sub-pixel area PA1, and fifth, sixth, seventh, and eighth domains DM5, DM6, DM7, and DM8 are defined in the second sub-pixel area PA2. In the present exemplary embodiment, the first to fourth domains DM1 to DM4 and the fifth to eighth domains DM5 to DM8 are arranged in a matrix configuration, a row direction of the matrix configuration is substantially in parallel to the first direction D1, and a column direction of the matrix configuration is substantially in parallel to the second direction D2.

When the electric field is generated between the pixel electrode PE and the common electrode CE, the liquid crystal molecules in the first to eighth domains DM1 to DM8 are aligned by the electric field. The liquid crystal molecules in the first domain DM1 are aligned in a first alignment direction DR1 by the electric field, the liquid crystal molecules in the second domain DM2 are aligned in a second alignment direction DR2 by the electric field, the liquid crystal molecules in the third domain DM3 are aligned in a third alignment direction DR3 by the electric field, and the liquid crystal molecules in the fourth domain DM4 are aligned in a fourth alignment direction DR4 by the electric field. The first to fourth alignment directions DR1 to DR4 are different from each other.

The first to eighth branch portions B1 to B8 have the same width with each other and are arranged at regular distances. Thus, when a sum of the width of each branch portion and the distance between the branch portions is referred to as a pitch, the pitch is constant in the first to eighth branch portions B1 to B8. For instance, when each of the first branch portions B1 has a first width WT, a distance between two adjacent first branch portions of the first branch portions B1 is a first distance DT, and the first width WT in the first to eighth branch portions B1 to B8 and the first distance DT in the first to eighth branch portions B1 to B8 are constant, the first branch portions B1 are arranged with a first pitch PT corresponding to a sum of the first width WT and the first distance DT. The first pitch PT is constant in the first branch portions B1.

In the present exemplary embodiment, the first pitch PT may be within a range from about 7.5 micrometers to about 8.5 micrometers, and more particularly, the first pitch PT may be about 8.0 micrometers. Hereinafter, an effect generated when the first pitch PT has the above-described size will be described in details.

Figure 5A:
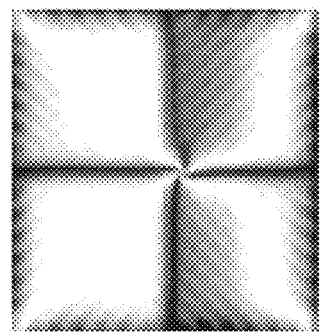
FIGS. 5A to 5C are photographs showing variations in brightness of first to fourth domains depending on pitches of first to fourth branch portions of a pixel electrode.
Figure 5B:
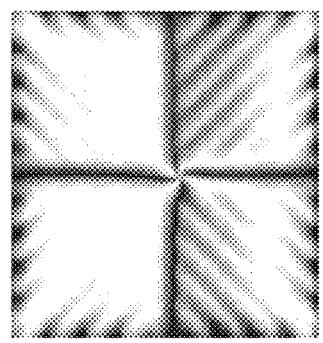
Figure 5C:
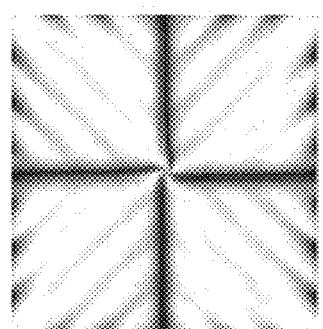

FIGS. 5A to 5C are photographs showing variations in brightness of the first to fourth domains depending on pitches of the first to fourth branch portions.

Referring to FIGS. 4C and 5A to 5C, a brightness decrease rate is changed depending on the size the pitch in the branch portions, e.g., with reference to FIG. 4C, the size of the first pitch PT of the first branch portions B1, and the brightness decrease rate shows a degree of decrease in the brightness in a percentage value in the first to fourth domains DM1 to DM4 (refer to FIG. 4A) due to the mis-alignment described with reference to FIG. 2A, wherein the opposite substrate 200 is partially lifted off. As the brightness decrease rate increases, the degree of decrease in the brightness becomes greater by the mis-alignment, and as the brightness decrease rate decreases, the degree of decrease in the brightness becomes smaller by the mis-alignment.

As shown in FIGS. 5A to 5C, when the first pitch PT is about 4.0 micrometers (μm), the brightness decrease rate is about 10.6%, and when the first pitch PT is about 6.0 micrometers, the brightness decrease rate is about 13.3%. On the contrary, when the first pitch PT is about 8.0 micrometers, the brightness decrease rate is about 5.3%. Thus, referring to the data shown in FIGS. 5A to 5C, the brightness decrease rate is changed depending on the first pitch PT, and a size of the first pitch PT, which minimizes the brightness decrease rate, may be obtained by using the data shown in FIGS. 5A to 5C.

In the present exemplary embodiment, since the brightness decrease rate becomes minimized when the first pitch PT is about 8.0 micrometers compared to that when the first pitch PT is about 4.0 micrometers or 6.0 micrometers, the first pitch PT may be set to be about 8.0 micrometers. Although the first pitch PT is designed to have about 8.0 micrometers, the first pitch PT may be changed within a range of about ±0.5 micrometers in a manufacturing process of the first branch portions B1. Therefore, the first pitch PT may be set to be within a range from about 7.5 micrometers to about 8.5 micrometers.

Hereinafter, as shown in FIGS. 5A to 5C, the reason why the brightness decrease rate becomes minimized when the first pitch PT is about 8.0 micrometers is described.

An electric force generated between an edge of each first branch portion B1 and the common electrode CE includes a vertical component and a horizontal component. The vertical component mainly causes a first alignment operation allowing the liquid crystal molecules LM of the liquid crystal layer LC to be laid on the first base substrate S1, and the horizontal component mainly causes a second alignment operation allowing the liquid crystal molecules LM of the liquid crystal layer LC to be rotated with respect to a rotational axis substantially perpendicular to the first base substrate S1. In this case, the distance between the first branch portions B1 becomes greater when the first pitch PT is about 8.0 micrometers than when the first pitch PT is about 4.0 micrometers or 6.0 micrometers, and thus the horizontal component may increase relatively more than the vertical component.

As an amount of the horizontal component increases, the second alignment operation becomes easier. Accordingly, even though the mis-alignment occurs in the display panel 300 (refer to FIG. 2A) and the first and second pre-tilt liquid crystals PL1 and PL2 are mis-aligned, the liquid crystal molecules LM have a tendency to be aligned more by the horizontal component of the electric force than by the mis-aligned first and second pre-tilt liquid crystals PL1 and PL2. As a result, as in the present exemplary embodiment, when an optimal value of the first pitch PT to allow the brightness decrease rate to be minimized is obtained, the number of liquid crystal molecules mis-aligned by the first and second pre-tilt liquid crystals PL1 and PL2 is reduced and the brightness in the first to fourth domains is prevented from being drastically decreased.

Figure 6A:
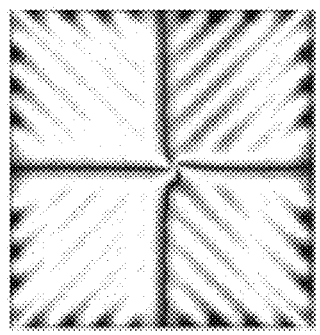
FIGS. 6A to 6C are photographs showing variations in brightness of first to fourth domains depending on a ratio of a width of the first to fourth branch portions to a distance between the first to fourth branch portions of the pixel electrode.
Figure 6B:
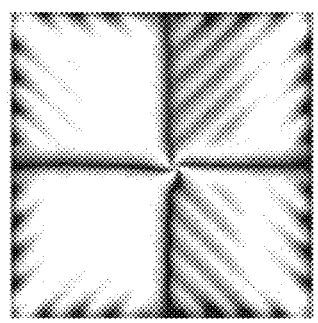
Figure 6C:
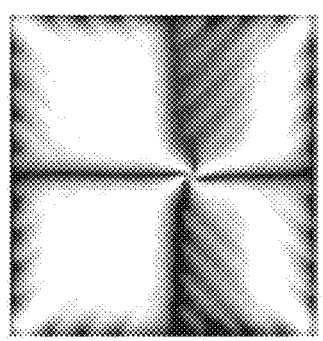
Figure 7A:
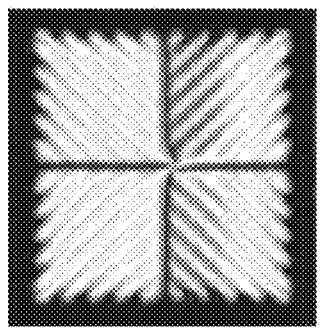
FIGS. 7A to 7D are photographs showing variations in brightness of first to fourth domains depending on a thickness of a liquid crystal layer shown in FIG. 4C.
Figure 7B:
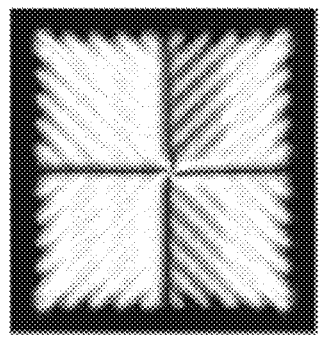
Figure 7C:
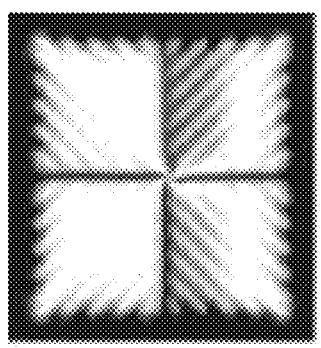
Figure 7D:
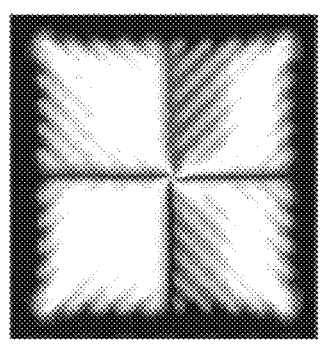

FIGS. 6A to 6C are photographs showing variations in brightness of the first to fourth domains depending on a ratio of the width of the first to fourth branch portions to the distance between the first to fourth branch portions of the pixel electrode.

Referring to FIGS. 4C and 6A to 6C, when a value obtained by dividing the first width WT of the first branch portion B1 by the first distance DT is defined as a width-to-distance ratio and the first pitch PT is constant, the brightness decrease rate is changed depending on the width-to-distance ratio.

More particularly, in a case that first pitch PT is constant, e.g., about 6.0 micrometers, the brightness decrease rate is about 13.3% when the width-to-distance ratio is about 1, and the brightness decrease rate is about 11.1% when the width-to-distance ratio is greater than 1. On the contrary, the brightness decrease rate is about 8.7% when the width-to-distance ratio is smaller than 1. Referring to the data shown in FIGS. 6A to 6C, the brightness decrease rate is changed depending on the width-to-distance ratio, and in the present exemplary embodiment, the width-to-distance ratio may be set to have a value smaller than 1 to minimize the brightness decrease rate.

Hereinafter, the reason why the brightness decrease rate is minimized when the width-to-distance ratio is smaller than 1 will be described. When the width-to-distance ratio is smaller than 1, the first distance DT between the first branch portions B1 is greater than the first width WT. Accordingly, as described earlier with reference to FIGS. 5A to 5C, the amount of the horizontal component becomes greater than the amount of the vertical component of the electric force generated between each edge of the first branch portions B1 and the common electrode CE. Therefore, the mis-alignment occurs in the display panel 300 (refer to FIG. 2A), and the liquid crystal molecules have a tendency to be aligned more by the horizontal component of the electric force than by the first and second pre-tilt liquid crystals PL1 and PL2. As a result, as in the present exemplary embodiment, when the optimal width-to-distance ratio, which minimizes the brightness decrease rate, is obtained, the number of liquid crystal molecules mis-aligned by the first and second pre-tilt liquid crystals PL1 and PL2 is reduced and the brightness in the first to fourth domains is prevented from being drastically decreased.

FIGS. 7A to 7D are photographs showing variations in brightness of the first to fourth domains depending on a thickness of the liquid crystal layer LC of FIG. 4C.

Referring to FIGS. 4C and 7A to 7D, the brightness decrease rate is changed depending on a thickness CG of the liquid crystal layer LC. More particularly, the brightness decrease rate is about 9.6% when the liquid crystal layer LC has the thickness CG of about 2.5 micrometers, and the brightness decrease rate is about 11.2% when the liquid crystal layer LC has the thickness CG of about 3.0 micrometers. In addition, the brightness decrease rate is about 12.7% when the liquid crystal layer LC has the thickness CG of about 3.5 micrometers, and the brightness decrease rate is about 13.3% when the liquid crystal layer LC has the thickness CG of about 4.0 micrometers. Therefore, referring to the data shown in FIGS. 7A to 7D, the brightness decrease rate is changed depending on the thickness CG of the liquid crystal layer LC, and the thickness CG of the liquid crystal layer LC, which minimizes the brightness decrease rate, may be obtained using the data.

In the present exemplary embodiment, since the brightness decrease rate is minimized when the liquid crystal layer LC has the thickness CG of about 2.5 micrometers compared to that when the liquid crystal layer LC has the thickness CG of about 3.0, 3.5, or 4.0 micrometers, the liquid crystal layer LC may be set to have the thickness CG of about 2.5 micrometers. Also, when considering tolerance in the thickness CG of the liquid crystal layer LC, the liquid crystal layer LC may have a thickness within a range from about 2.2 micrometers to about 2.8 micrometers.

In general, as the thickness CG of the liquid crystal layer LC decreases, the brightness decrease rate becomes smaller. However, when the liquid crystal layer LC has the thickness CG less than about 2.2 micrometers, the brightness in the domains where the mis-alignment does not occur may drastically decrease. Thus, the liquid crystal layer LC has the thickness CG within a range from about 2.2 micrometers to about 2.8 micrometers.

Hereinafter, the reason why the brightness decrease rate is changed depending on the thickness CG of the liquid crystal layer LC is described. As the thickness CG of the liquid crystal layer LC becomes smaller, a distance between the first branch portions B1 and the common electrode CE decreases and the size of the electric force increases. Thus, although the mis-alignment occurs in the display panel 300 (refer to FIG. 2A) and the first and second pre-tilt liquid crystals PL1 and PL2 are mis-aligned, the liquid crystal molecules LM have a tendency to be aligned more by the electric force than by the first and second pre-tilt liquid crystals PL1 and PL2, which are mis-aligned. Accordingly, as in the present exemplary embodiment, when the optimal thickness CG of the liquid crystal layer LC is obtained, the number of liquid crystal molecules mis-aligned by the first and second pre-tilt liquid crystals PL1 and PL2 decreases in the liquid crystal layer LC and the brightness in the first to fourth domains is prevented from being drastically decreased.

Figure 8A:
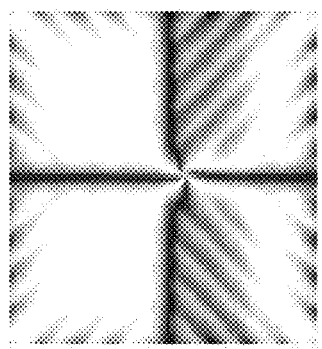
FIGS. 8A to 8C are photographs showing variations in brightness of first to fourth domains depending on a bend elastic constant of liquid crystal molecules in the liquid crystal layer shown in FIG. 4C.
Figure 8B:
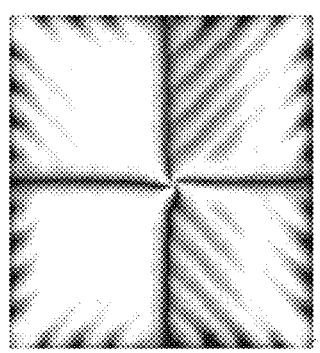
Figure 8C:
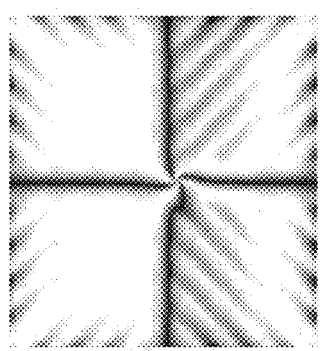
Figure 9A:
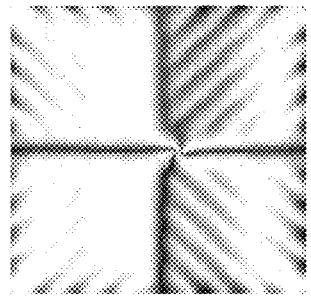
FIGS. 9A to 9F are photographs showing variations in brightness of first to fourth domains depending on a dielectric anisotropy value of the liquid crystal molecules of the liquid crystal layer shown in FIG. 4C.
Figure 9B:
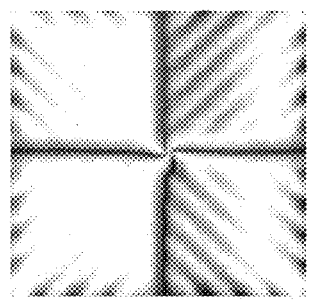
Figure 9C:
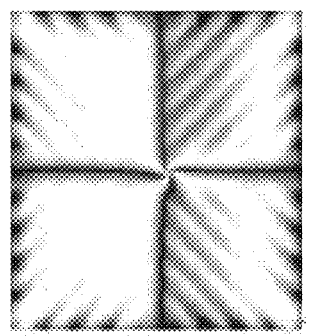
Figure 9D:
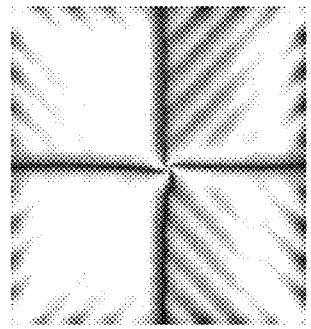
Figure 9E:
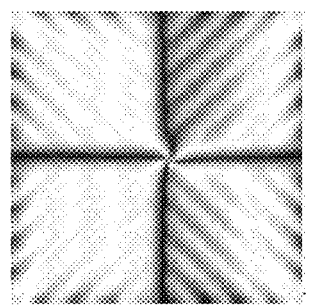
Figure 9F:
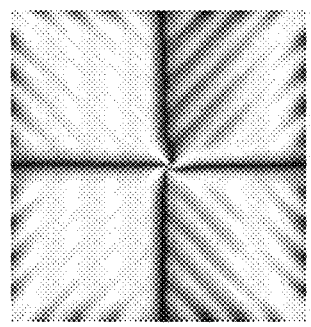

FIGS. 8A to 8C are photographs showing variations in brightness of the first to fourth domains depending on a bend elastic constant of the liquid crystal molecules in the liquid crystal layer of FIG. 4C.

Referring to FIGS. 4C and 8A to 8C, the brightness decrease rate is changed depending on the bend elastic constant of the liquid crystal molecules LM of the liquid crystal layer LC. More particularly, the brightness decrease rate is about 16.2% when the liquid crystal molecules LM have the bend elastic constant of about 16.1 pN, the brightness decrease rate is about 13.3% when the liquid crystal molecules LM have the bend elastic constant of about 13.1 pN, and the brightness decrease rate is about 9.8% when the liquid crystal molecules LM have the bend elastic constant of about 10.1 pN. Thus, referring to the data shown in FIGS. 8A to 8C, the brightness decrease rate is changed depending on the bend elastic constant, and the bend elastic constant, which minimizes the brightness decrease rate, is obtained by using the data described above.

In the present exemplary embodiment, since the brightness decrease rate is more reduced when the bend elastic constant of the liquid crystal layer LC is about 10.1 pN than when the bend elastic constant of the liquid crystal layer LC is about 13.1 pN or 16.1 pN, the bend elastic constant may be set to have the optimal value of about 10.1 pN. However, when the liquid crystal layer LC has the bend elastic constant less than about 10, the brightness in the domains where the mis-alignment does not occur may drastically decrease. Thus, in the present exemplary embodiment, the liquid crystal layer LC has the bend elastic constant in a range from about 10.0 pN to about 13.0 pN.

Hereinafter, the reason why the brightness decrease rate is more reduced when the bend elastic constant of the liquid crystal layer LC is about 10.1 pN than when the bend elastic constant of the liquid crystal layer LC is about 13.1 pN or 16.1 pN is described. As the bend elastic constant of the liquid crystal layer LC becomes smaller, the liquid crystal molecules LM have a tendency to be aligned more by the electric force generated in the liquid crystal layer LC than by interaction between the liquid crystal molecules LM including the first and second pre-tilt liquid crystals PL1 and PL2. Thus, although the mis-alignment occurs in the display panel 300 (refer to FIG. 2A) and the first and second pre-tilt liquid crystals PL1 and PL2 are mis-aligned, the liquid crystal molecules LM have the tendency to be aligned more by the electric force than by the first and second pre-tilt liquid crystals PL1 and PL2, which are mis-aligned. Accordingly, as in the present exemplary embodiment, in the case that the optimal bend elastic constant of the liquid crystal layer LC is obtained, a control capability of the electric force used to control the liquid crystal molecules LM is improved. As a result, the number of liquid crystal molecules mis-aligned by the first and second pre-tilt liquid crystals PL1 and PL2 decreases in the liquid crystal layer LC, and the brightness in the first to fourth domains is prevented from being drastically decreased.

FIGS. 9A to 9F are photographs showing variations of brightness in the first to fourth domains depending on a dielectric anisotropy value of the liquid crystal molecules of the liquid crystal layer of FIG. 4C.

Referring to FIGS. 4C and 9A to 9F, the brightness decrease rate is changed depending on intensity of the dielectric anisotropy $\Delta \in$ of the liquid crystal molecules LM in the liquid crystal layer LC. More particularly, on the assumption that the bend elastic constant of the liquid crystal molecules LM is constant, the brightness decrease rate is about 10.4% when the dielectric anisotropy is about −3.5, the brightness decrease rate is about 10.8% when the dielectric anisotropy is about −3.2, and the brightness decrease rate is about 13.3% when the dielectric anisotropy is about −2.8. In addition, the brightness decrease rate is about 13.4% when the dielectric anisotropy is about −2.5, the brightness decrease rate is about 24.0% when the dielectric anisotropy is about −2.2, and the brightness decrease rate is about 25.7% when the dielectric anisotropy is about −1.9. Referring to the data shown in FIGS. 9A to 9F, the brightness decrease rate is changed depending on the intensity of dielectric anisotropy, and the dielectric anisotropy value, which minimizes the brightness decrease rate, is obtained by using the data described above.

In the present exemplary embodiment, since the brightness decrease rate is more reduced when the intensity of dielectric anisotropy is about −3.2 or −3.5 than that when the intensity of dielectric anisotropy is about −2.8, −2.5, −2.2, or −1.9, the optimal dielectric anisotropy value may be set to be within a range from about −3.2 to about −3.5.

Meanwhile, as the dielectric anisotropy value becomes greater, the liquid crystal molecules LM have a tendency to be aligned more by the electric force generated in the liquid crystal layer LC than by interaction between the liquid crystal molecules LM including the first and second pre-tilt liquid crystals PL1 and PL2. Accordingly, as in the present exemplary embodiment, when the optimized dielectric anisotropy value is obtained, a control capability of the electric force on the alignment of the liquid crystal molecules LM is improved. As a result, the number of liquid crystal molecules mis-aligned by the first and second pre-tilt liquid crystals PL1 and PL2 decreases in the liquid crystal layer LC, and the brightness in the first to fourth domains is prevented from being drastically decreased.

Figure 10A:
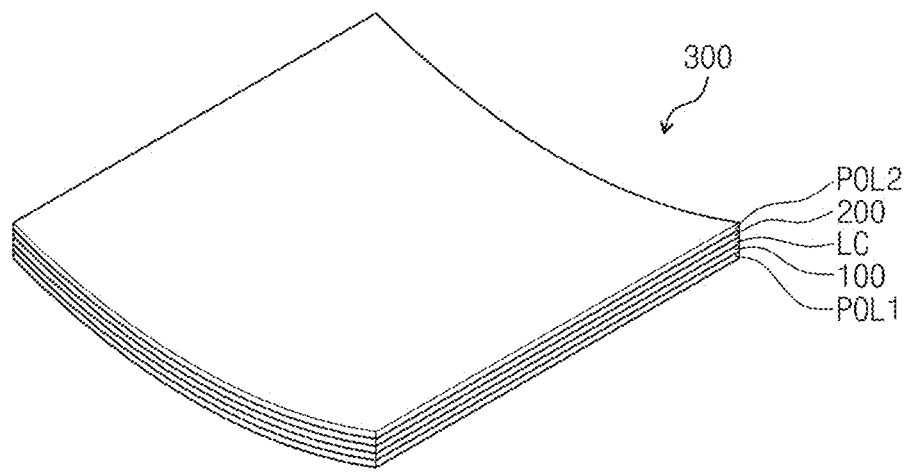
FIG. 10A is a schematic perspective view of the curved display device according to an embodiment of the inventive concept.
Figure 10B:
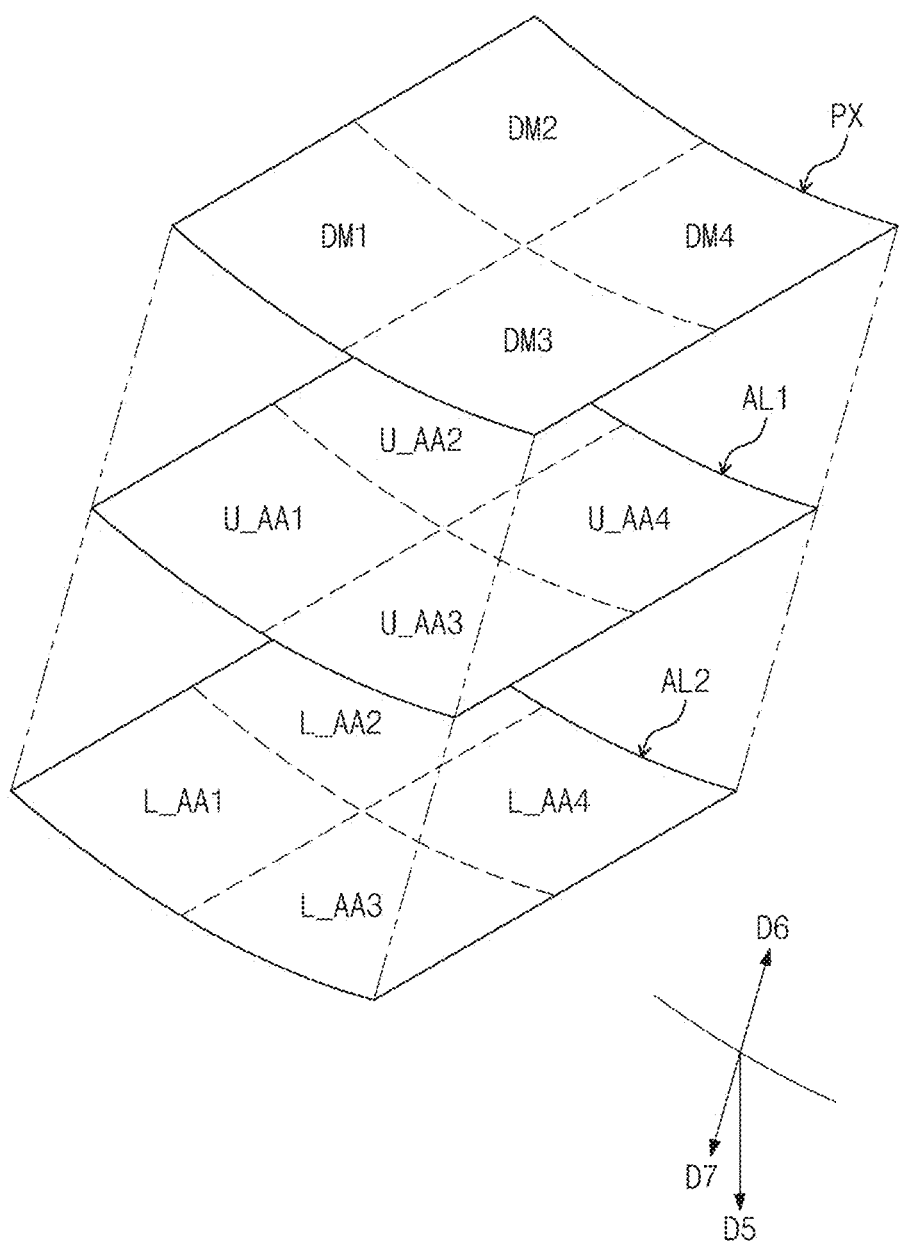
FIG. 10B is a schematic perspective view of a pixel and the first and second alignment layers corresponding to the pixel according to an embodiment of the inventive concept.
Figure 10C:
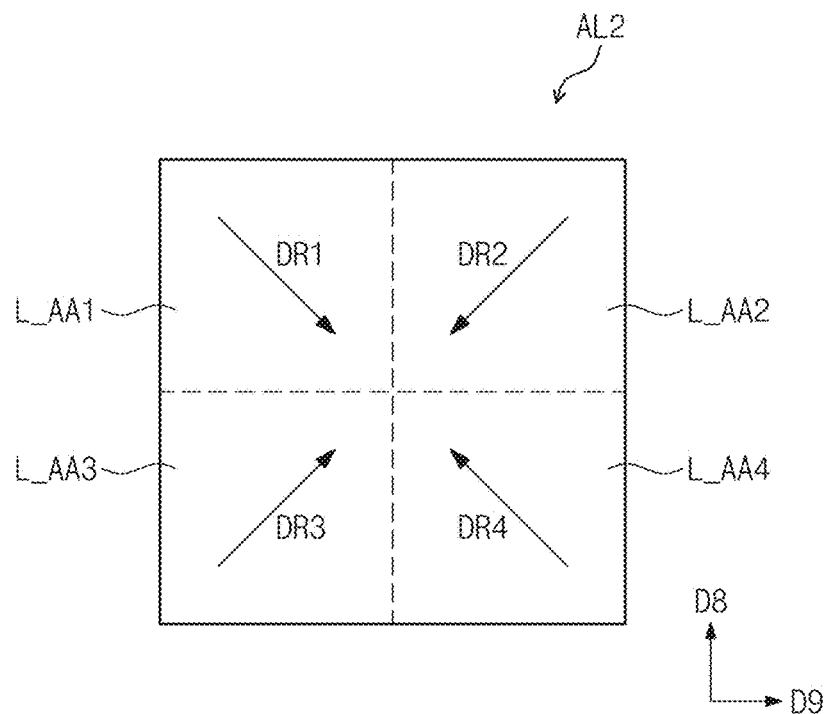
FIG. 10C is a schematic plan view of the first alignment layer.
Figure 10D:
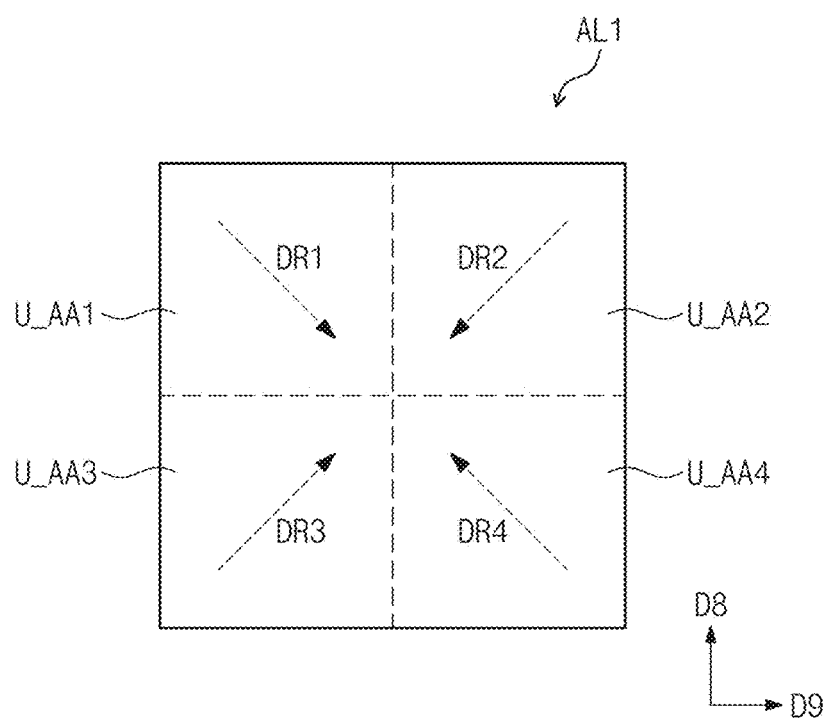
FIG. 10D is a schematic plan view of the second alignment layer.
Figure 10E:
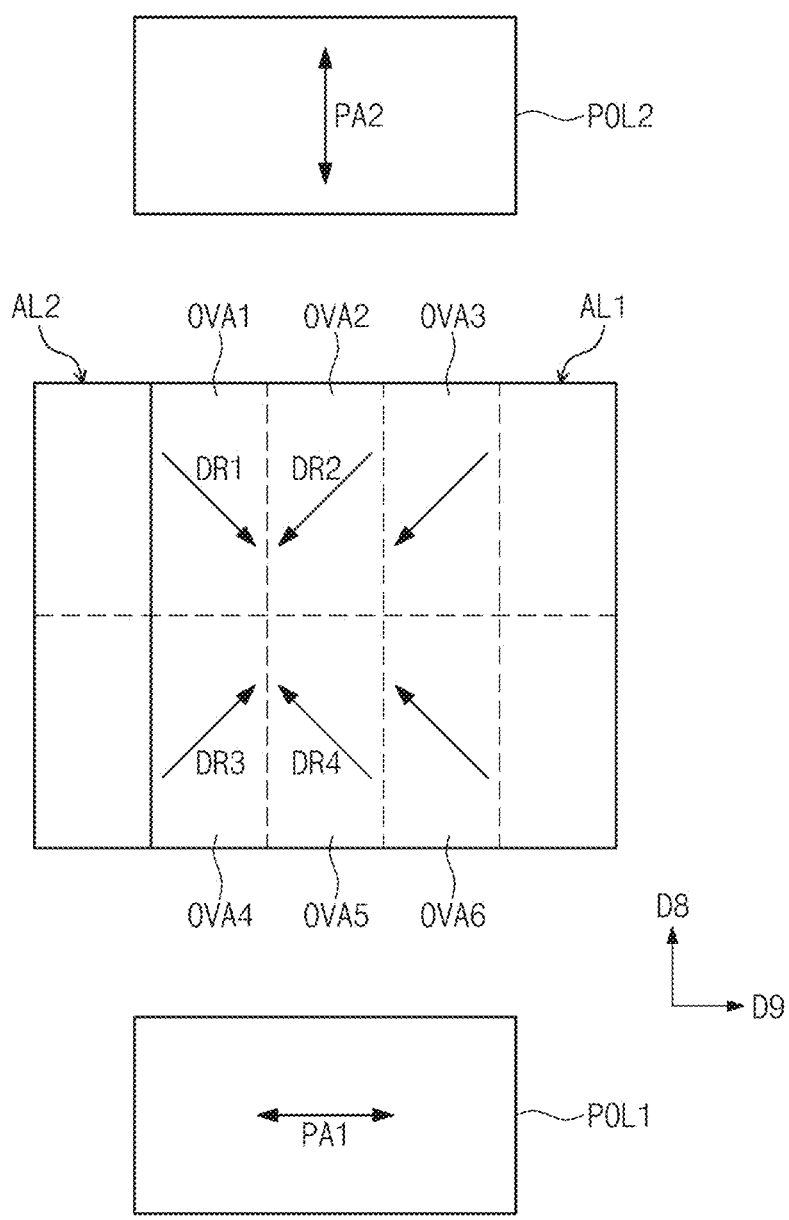
FIG. 10E is a schematic plan view of an overlapping area between the first and second alignment layers, a lower polarization plate, and an upper polarization plate.
Figure 10F:
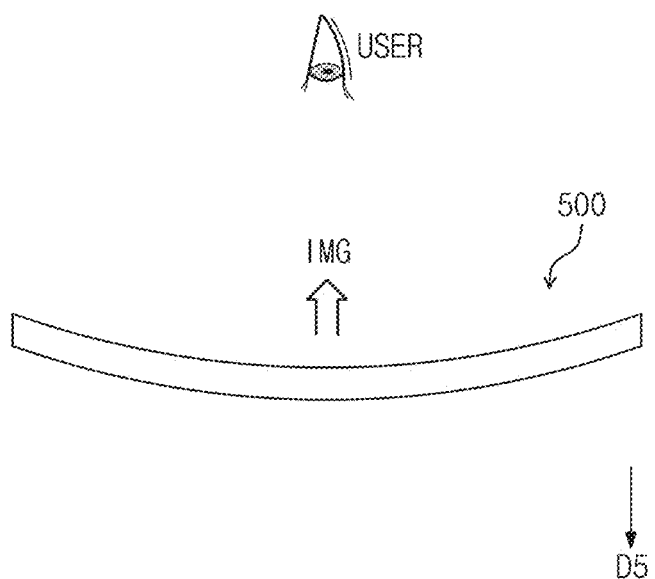
FIG. 10F is a schematic view illustrating a state in which a user recognizes an image displayed on the curved display device according to an embodiment of the inventive concept.

FIG. 10A is a schematic perspective view of the curved display device according to an embodiment of the inventive concept. FIG. 10B is a schematic perspective view of a pixel and the first and second alignment layers corresponding to the pixel according to an embodiment of the inventive concept. FIG. 10C is a schematic plan view of the first alignment layer. FIG. 10D is a schematic plan view of the second alignment layer. FIG. 10E is a schematic plan view of an overlapping area between the first and second alignment layers, a lower polarization plate, and an upper polarization plate. FIG. 10F is a schematic view illustrating a state in which a user recognizes an image displayed on the curved display device according to an embodiment of the inventive concept.

As shown in FIG. 10A, curved display panel 300 of FIGS. 4A to 4C having the display substrate 100, liquid crystal layer LC and opposite substrate 200 may also include a lower polarization plate POL1 and an upper polarization plate POL2.

As shown in FIG. 10B a pixel PX, in alignment with first and second alignment layers AL1 and AL2, includes first to fourth domains DM1, DM2, DM3, and DM4 and the first and second alignment layers AL1 and AL2 corresponding to the pixel PX.

The second alignment layer AL2 includes a first lower alignment area L_AA1, a second lower alignment area L_AA2, a third lower alignment area L_AA3, and a fourth lower alignment area L_AA4. The first to fourth lower alignment areas L_AA1, L_AA2, L_AA3, and L_AA4 may correspond to overlap the first to fourth domains DM1, DM2, DM3, and DM4, respectively, in a sixth direction D6 that is a normal direction of the pixel PX and a seventh direction D7 that is opposite to the sixth direction D6.

The first domain DM1, the second domain DM2, the third domain DM3, and the fourth domain DM4 may one-to-one correspond to the first lower alignment area L_AA1, the second lower alignment area L_AA2, the third lower alignment area L_AA3, and the fourth lower alignment area L_AA4. The second pre-tilt liquid crystal molecules PL2 (refer to FIGS. 4B and 4C) may be pre-tilted by the second reactive mesogens RM2 that are polymerized with each other on each of the first to fourth lower alignment areas L_AA1, L_AA2, L_AA3, and L_AA4. As the electrical fields are formed in the liquid crystal layer LC, the second pre-tilt liquid crystals PL2 may be more quickly aligned in a parallel direction than the liquid crystal molecules LM that are not pre-tilted. Liquid crystal molecules may be quickly rearranged from a vertically aligned state to a parallely aligned state.

First liquid crystal molecules, which are adjacent to the first alignment layer AL1, of the liquid crystal molecules LM are defined, and the first liquid crystal molecules are aligned to be parallel to the first pre-tilt liquid crystals PL1 by electric fields applied to the liquid crystal layer LC. Second liquid crystal molecules, which are adjacent to the second alignment layer AL2, of the liquid crystal molecules LM are defined, and the second liquid crystal molecules are aligned to be parallel to the second pre-tilt liquid crystals PL2 by the electric fields. When the electrical fields are applied to the liquid crystal layer LC, the second liquid crystal molecules and the second pre-tilt liquid crystals PL2 may be aligned in a direction parallel to an extension direction of the first branch parts (see reference numeral B1 of FIG. 2A) on the first lower alignment area L_AA1. Here, the extension direction of the first branch parts may be substantially parallel to the first liquid crystal alignment direction DR1 of FIG. 10C. The first liquid crystal alignment direction DR1 may represent a mean direction of parallely aligned directions when the second liquid crystal molecules and the second pre-tilt liquid crystals PL2 are parallely aligned on the first lower alignment area L_AA1.

Similarly, when the electric fields are applied to the liquid crystal layer LC, the second liquid crystal molecules and the second pre-tilt liquid crystals PL2 are aligned in a second liquid crystal alignment direction DR2 on the second lower alignment area L_AA2, the second liquid crystal molecules and the second pre-tilt liquid crystals PL2 are aligned in a third liquid crystal alignment direction DR3 on the third lower alignment area L_AA3, and the second liquid crystal molecules and the second pre-tilt liquid crystals PL2 are aligned in a fourth liquid crystal alignment direction DR4 on the fourth lower alignment area L_AA4.

The second liquid crystal alignment direction DR2 may represent a mean direction of parallely aligned directions when the second liquid crystal molecules and the second pre-tilt liquid crystals PL2 are parallely aligned on the second lower alignment area L_AA2.

The third liquid crystal alignment direction DR3 may represent a mean direction of parallely aligned directions when the second liquid crystal molecules and the second pre-tilt liquid crystals PL2 are parallely aligned on the third lower alignment area L_AA3.

The fourth liquid crystal alignment direction DR4 may represent a mean direction of parallely aligned directions when the second liquid crystal molecules and the second pre-tilt liquid crystals PL2 are parallely aligned on the fourth lower alignment area L_AA4.

Referring again to FIG. 10B, the first alignment layer AL1 includes a first upper alignment area U_AA1, a second upper alignment area U_AA2, a third upper alignment area U_AA3, and a fourth upper alignment area U_AA4. The upper alignment areas U_AA1, U_AA2, U_AA3, and U_AA4 may respectively correspond to overlap the domains DM1, DM2, DM3, and DM4 in a sixth direction D6 and seventh direction D7.

In this embodiment, the first alignment layer AL1 includes the first reactive mesogens RM1. However, an amount of the first reactive mesogens RM1 may be less than that of the second reactive mesogens RM2 as described above. In another embodiment, the amount of first reactive mesogens RM1 may be negligibly less in comparison to that of second reactive mesogens RM2.

Thus, the amount of first pre-tilt liquid crystals PL1 on each of the first, second, third, and fourth upper alignment areas U_AA1, U_AA2, U_AA3, and U_AA4 may be negligibly less in comparison to that of second pre-tilt liquid crystals PL2. Also, the amount of the first liquid crystal molecules may be negligibly less in comparison to that of second liquid crystal molecules. When a degree of an arrangement of the second liquid crystal molecules of the first lower alignment area L_AA1 in the first liquid crystal alignment direction DR1 is defined as a first scalar value, and a degree of an arrangement of the first liquid crystal molecules of the first upper alignment area U_AA1 in the first liquid crystal alignment direction DR1 is defined as a second scalar value, the second scalar value may be significantly less than the first scalar value. Additionally, since the first liquid crystal molecules are not substantially pre-tilted, a parallely aligned rate of the first liquid crystal molecules on the first upper alignment area U_AA1 may be significantly less than that of the second liquid crystal molecules on the first lower alignment area L_AA1. Also, the number of first liquid crystal molecules that are aligned in parallel to the first liquid crystal alignment direction DR1 may be significantly less than that of second liquid crystal molecules that are aligned in parallel to the first liquid crystal alignment direction DR1.

Similarly, when the electric fields are applied to the liquid crystal layer LC, the first liquid crystal molecules may be weakly aligned in the second liquid crystal alignment direction DR2 on the second upper alignment area U_AA2, be weakly aligned in the third liquid crystal alignment direction DR3 on the third upper alignment area U_AA3, and be weakly aligned in the fourth liquid crystal alignment direction DR4 on the fourth upper alignment area U_AA4.

Referring to FIGS. 10A to 10E, when viewed in the fifth direction D5, the first and second alignment layers AL1 and AL2 have (refer to FIG. 10E) first to sixth overlapping areas OVA1, OVA2, OVA3, OVA4, OVA5, and OVA6 which overlap each other.

When the electric fields are applied to the liquid crystal layer LC, an optical axis direction of the liquid crystal layer LC may be equal to a mean value of the parallely aligned direction of the second liquid crystal molecules on the lower alignment areas L_AA1, L_AA2, L_AA3, and L_AA4 and the parallely aligned direction of the first liquid crystal molecules on the upper alignment areas U_AA1, U_AA2, U_AA3, and U_AA4.

The second overlapping area OVA2 may be an area on which the second lower alignment area L_AA2 and the first upper alignment area U_AA1 overlap each other. Since the first liquid crystal molecules are not substantially pre-tilted, and the second liquid crystal molecules are more pre-tilted, a parallely aligned rate of the first liquid crystal molecules on the first overlapping area OVA1 may be significantly less than that of the second liquid crystal molecules. Also, the number of first liquid crystal molecules that are aligned in parallel to the second liquid crystal alignment direction DR2 may be significantly less than that of second liquid crystal molecules that are aligned in parallel to the first liquid crystal alignment direction DR1.

Thus, when the electric fields are applied to the liquid crystal layer LC, the optical axis direction of the liquid crystal layer LC on the second overlapping area OVA2 may be substantially parallel to the second liquid crystal alignment direction DR2. Similarly, when the electric fields are applied to the liquid crystal layer LC, an optical axis direction of the liquid crystal layer LC on the fifth overlapping area OVA5 may be substantially parallel to the fourth liquid crystal alignment direction DR4.

The parallely aligned direction of the second liquid crystal molecules on the first overlapping area OVA1 may be the substantially same as that of the first liquid crystal molecules. Thus, the optical axis direction of the liquid crystal layer LC on the first overlapping area OVA1 is substantially parallel to the first liquid crystal alignment direction DR1. Similarly, an optical axis direction of the liquid crystal layer LC on the third overlapping area OVA3 is substantially parallel to the second liquid crystal alignment direction DR2, an optical axis direction of the liquid crystal layer LC on the fourth overlapping area OVA4 is substantially parallel to the third liquid crystal alignment direction DR3, and an optical axis direction of the liquid crystal layer LC on the sixth overlapping area OVA6 is substantially parallel to the fourth liquid crystal alignment direction DR4.

The lower polarization plate POL1 has a first transmission axis PA1, and the upper polarization plate POL2 has a second transmission axis PA2. The first transmission axis PA1 and the second transmission axis PA2 are substantially perpendicular to each other. For example, when the first transmission axis PA1 is parallel to the ninth direction D9, the second transmission axis PA2 is parallel to the eighth direction D8. For convenience of description, FIG. 10E illustrates the lower and upper polarization plates POL1 and POL2 each of which has a size relatively less than that of each of the first and second alignment layers AL1 and AL2.

Referring to FIGS. 10A to 10F, the optical axis direction of the liquid crystal layer LC is not parallel to the directions of the first transmission axis PA1 of the lower polarization plate POL1 and the second transmission axis PA2 of the upper polarization plate POL2 within each of the first to sixth overlapping areas OVA1, OVA2 OVA3, OVA4, OVA5, and OVA6 of the curved display device 500 according to an embodiment of the inventive concept. Thus, the user USER may see light passing through the first to sixth overlapping areas OVA1, OVA2 OVA3, OVA4, OVA5, and OVA6.

Figure 11A:
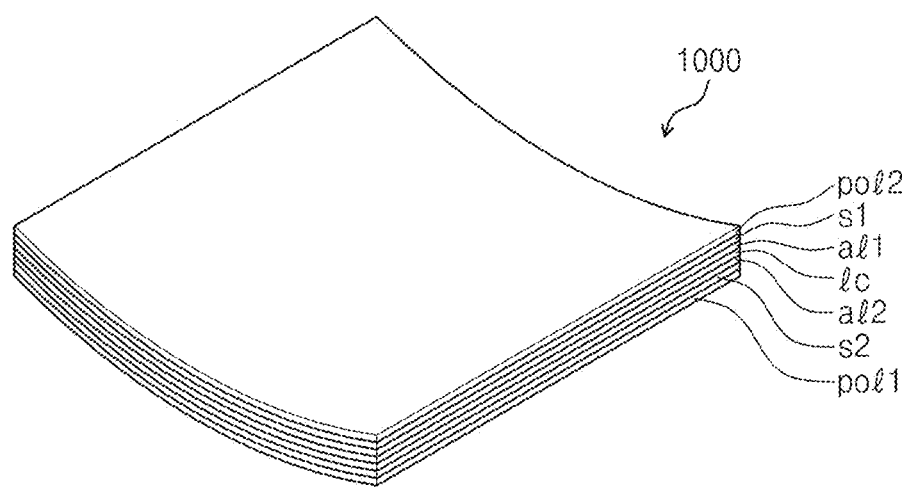
FIG. 11A is a schematic perspective view of a curved display device according to a comparative example of the inventive concept.
Figure 11B:
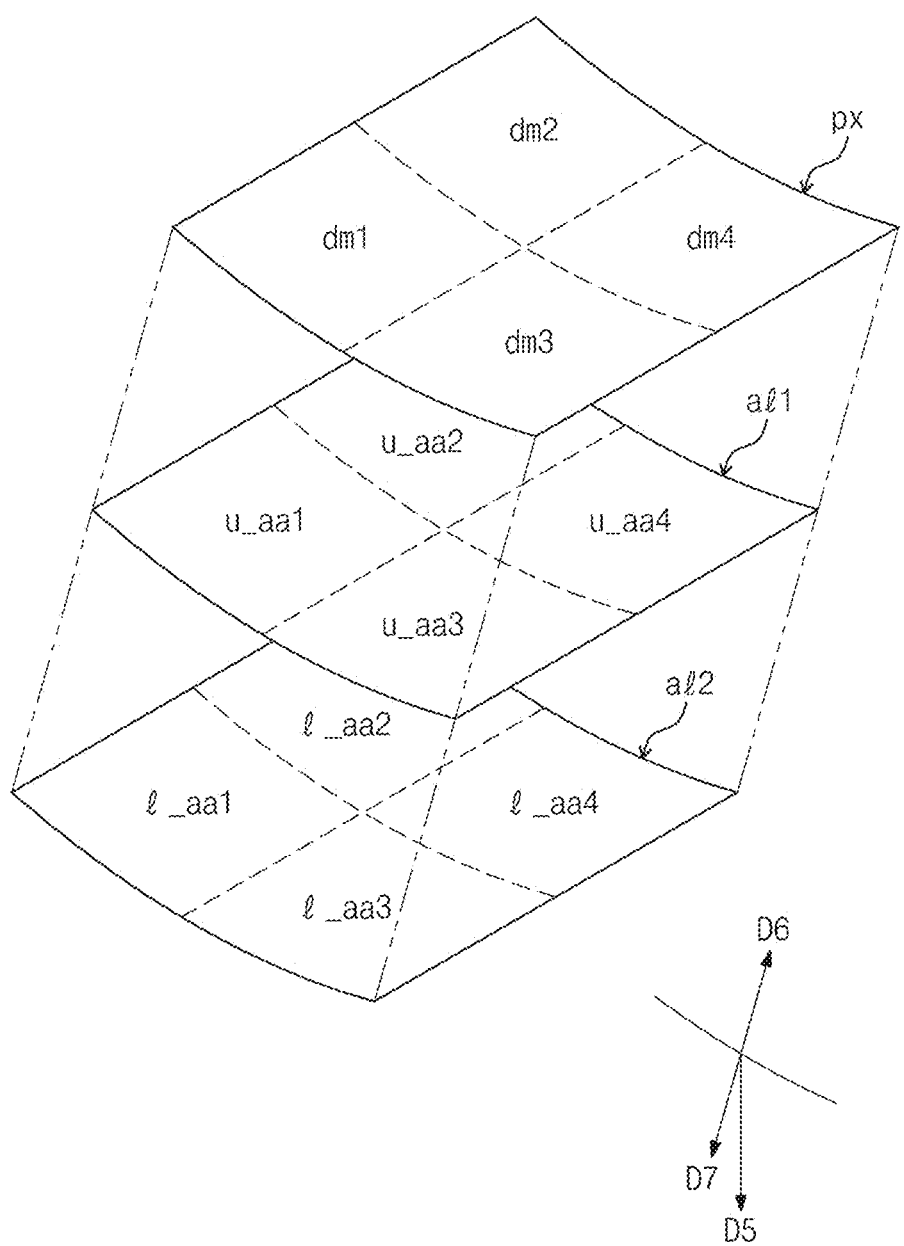
FIG. 11B is a schematic perspective view of a pixel and first and second alignment layers corresponding to the pixel, which are included in the curved display device according to a comparative example of the inventive concept.
Figure 11C:
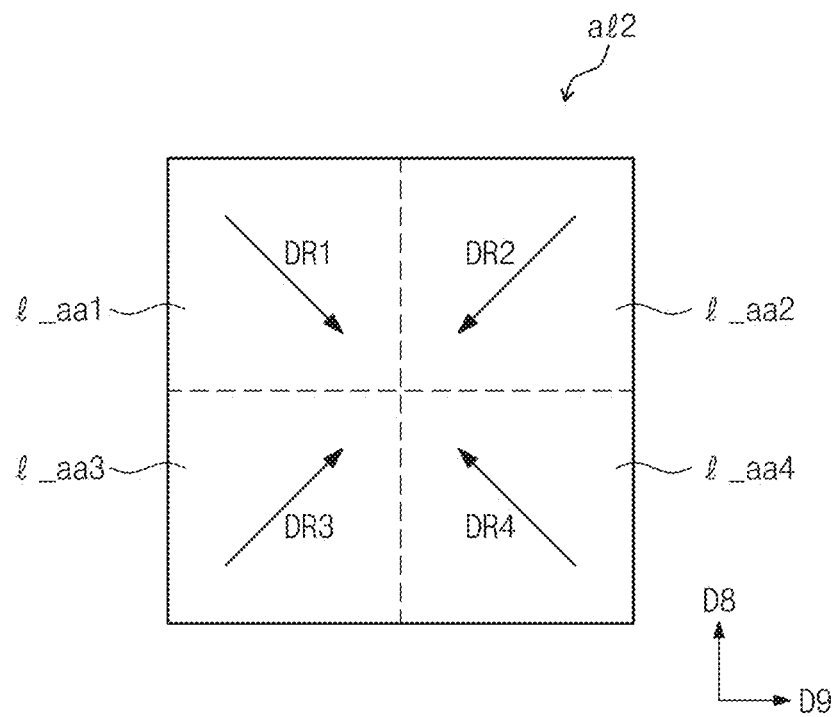
FIG. 11C is a schematic plan view of the first alignment layer.
Figure 11D:
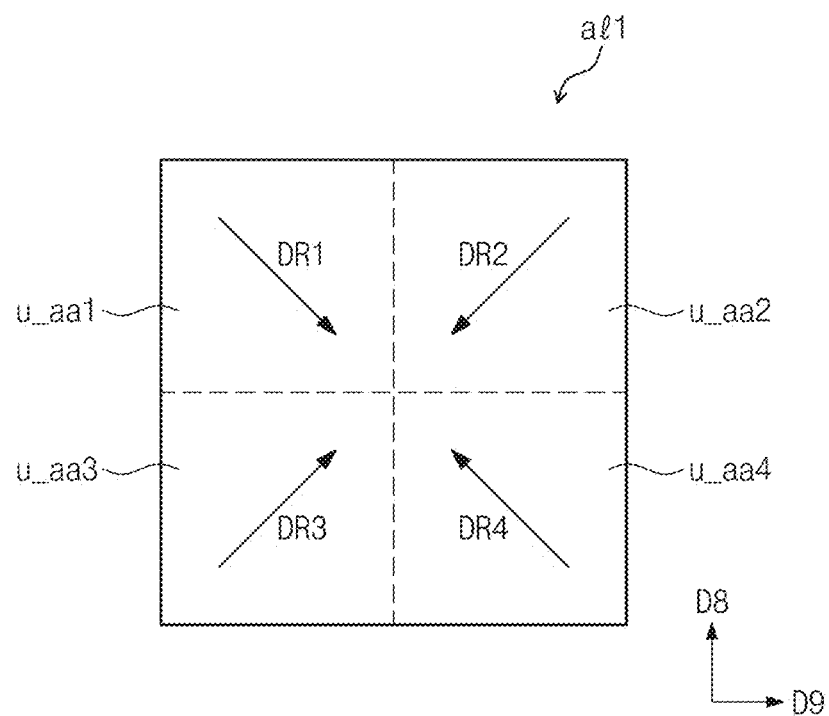
FIG. 11D is a schematic plan view of the second alignment layer.
Figure 11E:
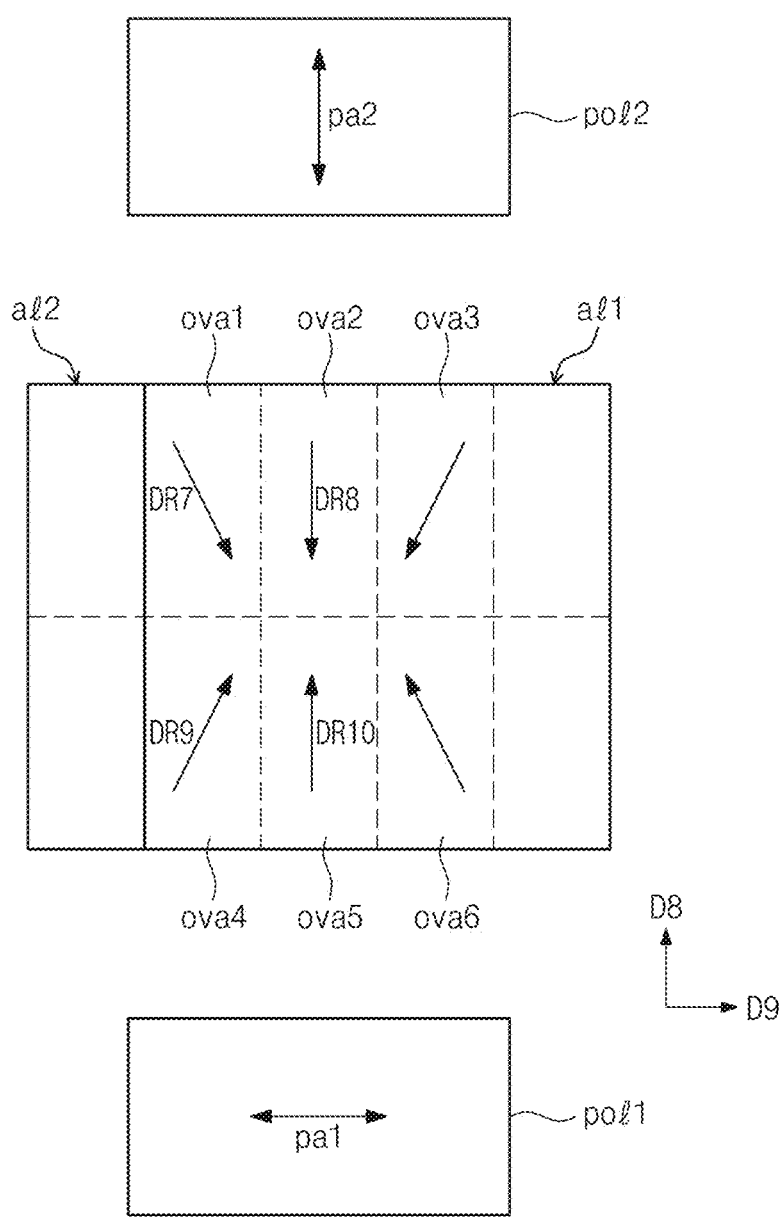
FIG. 11E is a plan view of overlapping areas between the first and second alignment layers and polarization plates.

FIG. 11A is a schematic perspective view of a curved display panel according to a comparative example of the inventive concept. FIG. 11B is a schematic perspective view of a pixel and first and second alignment layers corresponding to the pixel, which are included in the curved display device according to a comparative example of the inventive concept. FIG. 11C is a schematic plan view of the first alignment layer. FIG. 11D is a schematic plan view of the second alignment layer. FIG. 11E is a schematic plan view of overlapping areas between the first and second alignment layers and polarization plates.

As shown in FIG. 11A, curved display panel 1000 is similar to the display panel of FIGS. 2B, 4C and 10A in that it may include a second base substrate s2, a second alignment layer all, a liquid crystal layer 1c, a first alignment layer al1, a first base substrate s1, a lower polarization plate poll and an upper polarization plate pol2.

Referring to FIGS. 11A to 11E, a curved display panel 1000 according to a comparative example includes a first alignment layer al1 including reactive mesogens that are polymerized with each other and a second alignment layer al2 including reactive mesogens that are polymerized with each other. The first and second alignment layers al1 and al2 may include the reactive mesogens having the substantially same amount. Thus, first liquid crystal molecules of a liquid crystal layer 1c are pre-tilted by the first alignment layer al1, and second liquid crystal molecules of the liquid crystal layer 1c are pre-tilted by the second alignment layer al2.

Also, a pre-tilt angle of the first liquid crystal molecules may be the same as a pre-tilt angle of the second liquid crystal molecules. When electric fields are applied to the liquid crystal layer 1c, the second liquid crystal molecules on lower alignment areas l_aa1, l_aa2, l_aa3, and l_aa4 (see FIG. 11B) provided on the second alignment layer al2 and the first liquid crystal molecules on upper alignment areas u_aa1, u_aa2, u_aa3, and u_aa4 provided on the first alignment layer al1 are parallely aligned in the same direction. Since all of the first and second liquid crystal molecules are pre-tilted, rates at which the first and second liquid crystal molecules are parallely aligned may be similar to each other.

In detail, referring to FIGS. 11C and 11D, when a driving voltage is applied to apply the electric fields, the second liquid crystal molecules on the first lower alignment area l_aa1 and the first liquid crystal molecules on the first upper alignment area u_aa1 are parallely aligned in a first liquid crystal alignment direction DR1, and the second liquid crystal molecules on the second lower alignment area l_aa2 and the first liquid crystal molecules on the second upper alignment area u_aa2 are parallely aligned in a second liquid crystal alignment direction DR2. The second liquid crystal molecules on the third lower alignment area l_aa3 and the first liquid crystal molecules on the third upper alignment area u_aa3 are parallely aligned in a third liquid crystal alignment direction DR3, and the second liquid crystal molecules on the fourth lower alignment area l_aa4 and the first liquid crystal molecules on the fourth upper alignment area u_aa4 are parallely aligned in a fourth liquid crystal alignment direction DR4.

Referring to FIG. 11E, when viewed in a fifth direction D5 (see FIG. 11B), the first and second alignment layers al1 and al2 have overlapping areas which overlap each other. The overlapping areas include a first overlapping area ova1, a second overlapping area ova2, a third overlapping area ova3, a fourth overlapping area ova4, a fifth overlapping area ova5, and a sixth overlapping area ova6.

In case of the curved display panel 1000 according to the comparative example of the inventive concept, the first and second liquid crystal molecules are pre-tilted at the same pre-tilt angle on the second overlapping area ova2. Thus, an optical axis direction of the liquid crystal layer 1c on the second overlapping area ova2 is substantially parallel to an eighth liquid crystal alignment direction DR8 that is the sum of the first and second liquid crystal alignment directions DR1 and DR2. Similarly, an optical axis direction of the liquid crystal layer 1c on the fifth overlapping area ova5 is substantially parallel to a tenth liquid crystal alignment direction DR10 that is the sum of the third and fourth liquid crystal alignment directions DR3 and DR4.

The curved display device 1000 according to the comparative example of the inventive concept may also include lower polarization plate pol1 and upper polarization plate pol2. Here, a first transmission axis pa1 of the lower polarization plate pol1 and a second transmission axis pa2 of the upper polarization plate pol2 are perpendicular to each other. For example, when the first transmission axis pa1 of the lower polarization plate pol1 is parallel to the ninth direction D9, the second transmission axis pa2 of the upper polarization plate pol2 is parallel to the eighth direction D8. The eighth direction D8 may be parallel to the eighth liquid crystal alignment direction DR8 or the tenth liquid crystal alignment direction DR10.

Thus, when the driving voltage is applied to apply the electric fields in the curved display panel 1000 according to the comparative example of the inventive concept, the optical axis direction of the liquid crystal layer 1c within the second and fifth overlapping areas ova2 and ova5 may be parallel to a direction of the first transmission layer pa1 of the lower polarization plate pol1 or the second transmission layer pa2 of the upper polarization plate pol2.

When the direction of the first transmission axis pa1 of the lower polarization plate pol1 is parallel to the optical axis direction of the liquid crystal layer 1c within each of the second and fifth overlapping areas ova2 and ova5, light passing through the lower polarization plate pol1 may be blocked by the second transmission axis pa2 of the upper polarization plate pol2 after passing through the second and fifth overlapping areas ova2 and ova5.

Also, when the direction of the second transmission axis pa2 of the upper polarization plate pol2 is parallel to the optical axis direction of the liquid crystal layer 1c within each of the second and fifth overlapping areas ova2 and ova5, light passing through the lower polarization plate pol1 may be blocked without passing through the second and fifth overlapping area ova2 and ova5. Thus, the user may see light of the second and fifth overlapping areas ova2 and ova5.

That is, in the curved display panel 1000 according to the comparative example of the inventive concept, the first liquid crystal molecules on the lower alignment areas1_aa1, 1_aa2, 1_aa3, 1_aa4 of the second alignment layer al2 and the first liquid crystal molecules on the upper alignment areas u_aa1, u_aa2, u_aa3, and u_aa4 of the first alignment layer al1 are aligned in the same direction. Thus, when the first and second substrates are curved, the user does not see light to cause texture defects by which the light is darkly seen within the pixel.

On the other hand, according to the curved display device according to the embodiment of inventive concept, which is described with reference to FIGS. 10A to 10F, the pre-tilted degrees of the first and second liquid crystal molecules are different from each other by the first and second alignment layers. Thus, even though the curved display device is curved, the texture defects may not occur to improve the display quality of the curved display device.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A curved display device comprising:
a display substrate curved along a first direction and comprising a pixel electrode disposed in a pixel area and a second alignment layer disposed on the pixel electrode;
an opposite substrate coupled to the display substrate, curved along the first direction, and comprising a common electrode generating an electric field in cooperation with the pixel electrode and a first alignment layer disposed on the common electrode, wherein each of the first alignment layer and the second alignment layer is curved along the first direction; and
a liquid crystal layer interposed between the display substrate and the opposite substrate and comprising liquid crystal molecules,
wherein the first alignment layer comprises different material from the second alignment layer, and the first and second alignment layers align a portion of the liquid crystal molecules at pre-tilt angles, wherein the first alignment layer does not comprise a photoinitiator and the second alignment layer comprises a photoinitiator so as to align liquid crystal molecules at different pre-tilt angles from each other,
wherein the pixel electrode comprises branch portions extending in a direction inclined with respect to the first direction when viewed in a plan view, the branch portions having a pitch, which is defined by a sum of a width of each branch portion and a distance between the branch portions, is within a range from about 7.5 micrometers to about 8.5 micrometers, inclusive,
wherein a value obtained by dividing the width of the branch portions by the distance between the branch portions is less than or equal to 0.5,
wherein first liquid crystal molecules, which are adjacent to the first alignment layer, of the liquid crystal molecules have a first pre-tilt angle, and
second liquid crystal molecules, which are adjacent to the second alignment layer, of the liquid crystal molecules have a second pre-tilt angle smaller than the first pre-tilt angle.

2. The curved display device of claim 1, wherein the width of the branch portions is constant, and the distance between the branch portions is constant.

3. The curved display device of claim 1, wherein the pixel area comprises a first sub-pixel area and a second sub-pixel area, each of the first and second sub-pixel areas comprises a first domain, a second domain, a third domain, and a fourth domain, the first to fourth domains are arranged in a matrix form of two rows by two columns, a row direction of the matrix form is substantially parallel to the first direction, a column direction of the matrix form is substantially parallel to a second direction substantially perpendicular to the first direction, and the liquid crystal molecules are aligned in different directions from each other in the first to fourth domains by the electric field.

4. The curved display device of claim 3, wherein the pixel electrode further comprises:
 a horizontal trunk portion extending in the first direction and connected to the branch portions; and
 a vertical trunk portion extending in the second direction and connected to the branch portions, and the branch portions comprise:
 first branch portions branched from the horizontal trunk portion or the vertical trunk portion to be disposed in the first domain and extending in a direction inclined with respect to the first and second directions when viewed in a plan view;
 second branch portions branched from the horizontal trunk portion or the vertical trunk portion to be disposed in the second domain and extending in a direction inclined with respect to the first and second directions when viewed in a plan view;
 third branch portions branched from the horizontal trunk portion or the vertical trunk portion to be disposed in the third domain and extending in a direction inclined with respect to the first and second directions when viewed in a plan view; and
 fourth branch portions branched from the horizontal trunk portion or the vertical trunk portion to be disposed in the fourth domain and extending in a direction inclined with respect to the first and second directions when viewed in a plan view.

5. The curved display device of claim 1, wherein the second pre-tilt angle ranges from about 80° to about 90°.

6. The curved display device of claim 1, wherein the first pre-tilt angle ranges from about 88° to about 90°.

7. The curved display device of claim 1, wherein the display substrate has a first curvature radius, and the opposite substrate has a second curvature radius different from the first curvature radius.

8. The curved display device of claim 1, wherein the display substrate further comprises a pixel electrode disposed on the second base substrate, and
 the opposite substrate further comprises a common electrode disposed on the first base substrate to face the pixel electrode.

9. The curved display device of claim 8, wherein the pixel electrode comprises:
 a stem part; and
 a plurality of branch parts extending from the stem part.

10. The curved display device of claim 9, wherein the pixel electrode is defined as a plurality of domains on which the plurality of branch parts extend in directions different from each other with respect to the stem part.

11. The curved display device of claim 9, wherein branch parts of each of the domains extend in parallel to each other.

12. The curved display device of claim 11, wherein the domains comprise a first domain, a second domain, a third domain, and a fourth domain.

* * * * *